(12) United States Patent
Davis

(10) Patent No.: US 8,210,572 B2
(45) Date of Patent: Jul. 3, 2012

(54) MAGNETIC COUPLING DEVICE AND METHOD

(75) Inventor: Mitchell G. Davis, Redington Beach, FL (US)

(73) Assignee: Hana Consulting, Inc., Largo, FL (US)

( * ) Notice: Subject to any disclaimer, the term of this patent is extended or adjusted under 35 U.S.C. 154(b) by 569 days.

(21) Appl. No.: 12/129,804

(22) Filed: May 30, 2008

(65) Prior Publication Data
US 2009/0293238 A1    Dec. 3, 2009

(51) Int. Cl.
*F16L 25/00* (2006.01)
(52) U.S. Cl. ........................................................ 285/9.1
(58) Field of Classification Search .................... 285/9.1
See application file for complete search history.

(56) References Cited

U.S. PATENT DOCUMENTS

| | | | |
|---|---|---|---|
| 712,447 A | 10/1902 | Woolley | |
| 2,672,257 A | 4/1950 | Simmonds | |
| 2,793,057 A | 5/1957 | McGugin | |
| 2,912,263 A * | 11/1959 | Christy | 285/9.1 |
| 2,944,842 A * | 7/1960 | Stiff | 285/368 |
| 2,953,970 A * | 9/1960 | Maynard | 285/9.1 |
| 3,085,407 A | 4/1963 | Tomlinson | |
| 3,181,895 A * | 5/1965 | Cator | 285/9.1 |
| 3,582,017 A * | 6/1971 | Zecca | 285/9.1 |
| 3,776,579 A | 12/1973 | Gale | |
| 3,961,721 A | 6/1976 | Gordon et al. | |
| 4,004,298 A * | 1/1977 | Freed | 285/9.1 |
| 4,051,768 A * | 10/1977 | Bayles | 285/9.1 |
| 4,570,810 A | 2/1986 | Hawkins | |
| 4,641,859 A | 2/1987 | Walters | |
| 4,747,744 A | 5/1988 | Dominique et al. | |
| 4,854,110 A | 8/1989 | Korcz | |
| 4,991,270 A | 2/1991 | Aoki | |
| 5,015,061 A * | 5/1991 | Giannini | 385/56 |
| 5,096,230 A * | 3/1992 | Pausch et al. | 285/9.1 |
| 5,131,070 A | 7/1992 | Chiu et al. | |
| 5,405,037 A | 4/1995 | Piron | |
| 5,419,354 A * | 5/1995 | Krynicki | 285/9.1 |
| 5,473,799 A | 12/1995 | Aoki | |
| 5,624,410 A * | 4/1997 | Tsukada et al. | 604/256 |
| 5,707,091 A | 1/1998 | Morita | |
| 5,865,482 A | 2/1999 | Aoki | |
| 5,983,464 A | 11/1999 | Bauer | |
| 5,987,715 A | 11/1999 | Khon | |

(Continued)

OTHER PUBLICATIONS

International Search Report and Written Opinion dated May 12, 2009, issued in PCT/US09/38169.

(Continued)

*Primary Examiner* — David E Bochna
(74) *Attorney, Agent, or Firm* — Larson & Larson, P.A.; Frank Liebenow; Justin Miller

(57) ABSTRACT

An article and method for coupling two or more objects together uses magnetically attractive forces generated by corresponding magnet(s) and/or metal piece(s) positioned at or near the periphery of the two or more objects. Multiple magnet(s) and/or metal piece(s) are spaced-apart around the periphery of the two or more objects. Alternatively, two corresponding annular magnet(s) and/or pieces of metal are used. Where multiple spaced-apart magnet(s) and/or metal piece(s) are used, the magnet(s) and/or metal piece(s) are either regularly spaced-apart or asymmetrically spaced. The coupling device is generally designed to hold tubular objects together. The coupling device has numerous advantages, including, for example, rapid assembly and disassembly, pressure release characteristics, superior ergonomics for the user, increased adjustability for specific applications, and improved durability.

75 Claims, 14 Drawing Sheets

U.S. PATENT DOCUMENTS

| | | | |
|---|---|---|---|
| 6,131,247 | A | 10/2000 | Morita |
| 6,215,381 | B1 | 4/2001 | Aoki |
| 6,295,702 | B1 | 10/2001 | Bauer |
| 6,564,434 | B1 | 5/2003 | Morita |
| 6,978,521 | B2 | 12/2005 | Morita |
| 7,156,252 | B2 | 1/2007 | Morin |
| 7,172,101 | B2 | 2/2007 | Find |
| 7,178,207 | B2 | 2/2007 | Wong et al. |
| 7,252,112 | B1 * | 8/2007 | Imler et al. ............... 137/614.04 |
| 7,487,796 | B2 * | 2/2009 | Imler et al. ............... 137/614.04 |
| 7,669,899 | B2 * | 3/2010 | Carson ........................... 285/9.1 |
| 7,793,987 | B1 * | 9/2010 | Busch et al. ................... 285/9.1 |

OTHER PUBLICATIONS

International Search Report, PCT/US08/59611, dated Jul. 24, 2008.
Written Opinion of the International Searching Authority, PCT/US08/59611, dated Jul. 24, 2008.

* cited by examiner

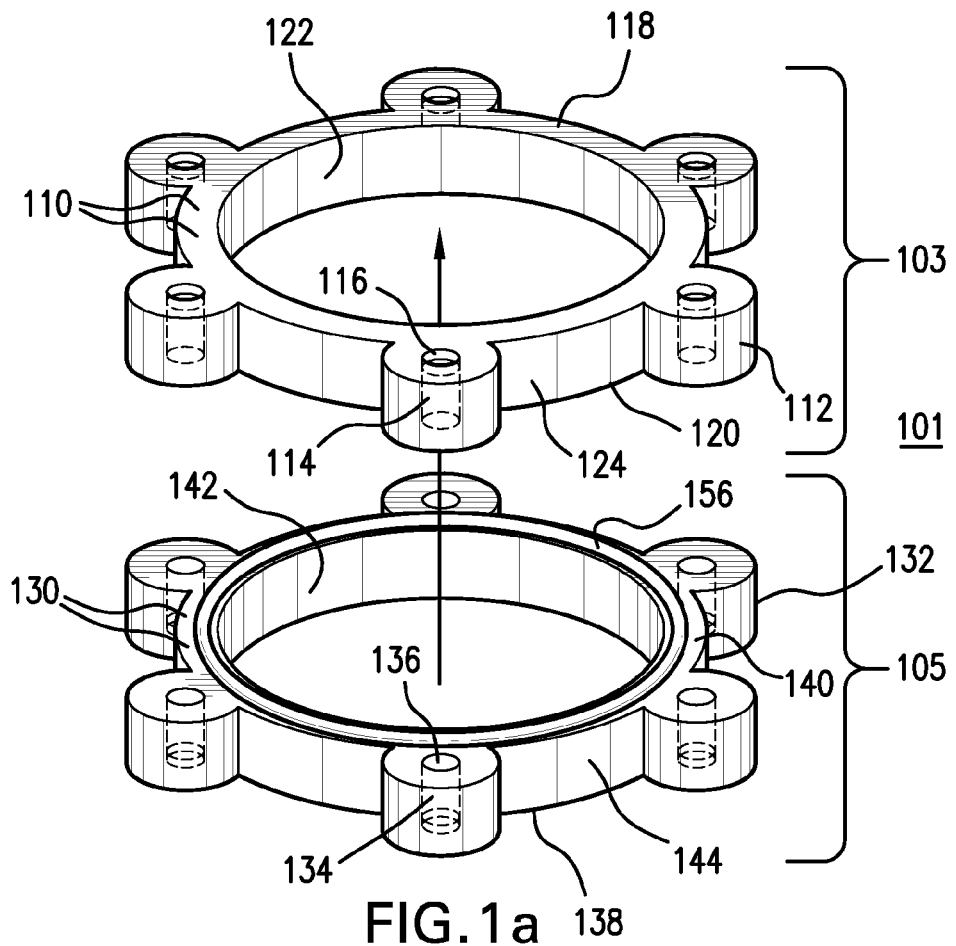
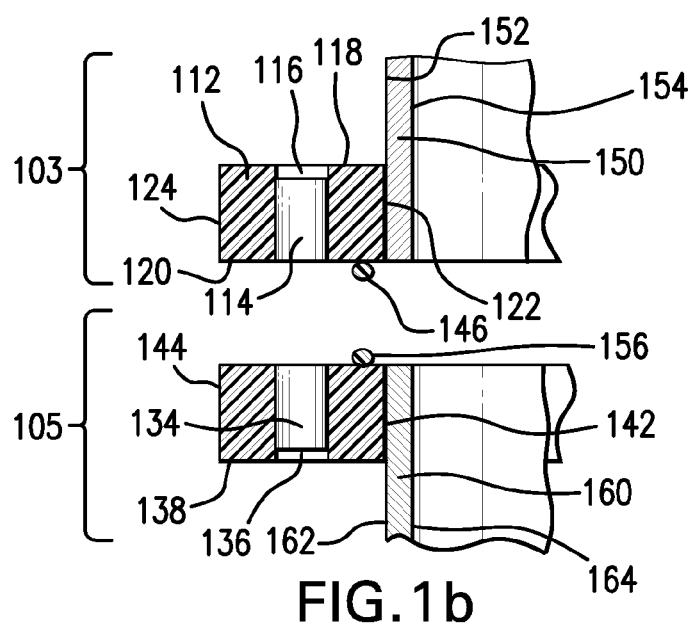 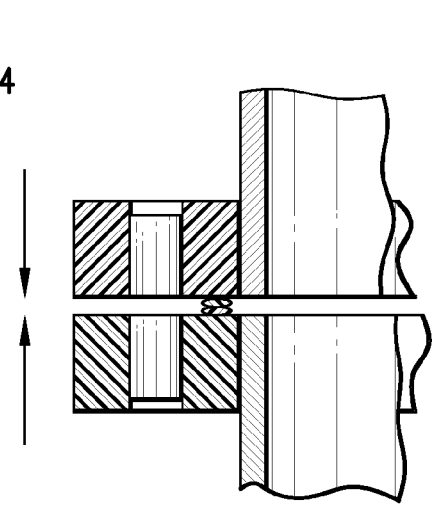
FIG.1a
FIG.1b       FIG.1c

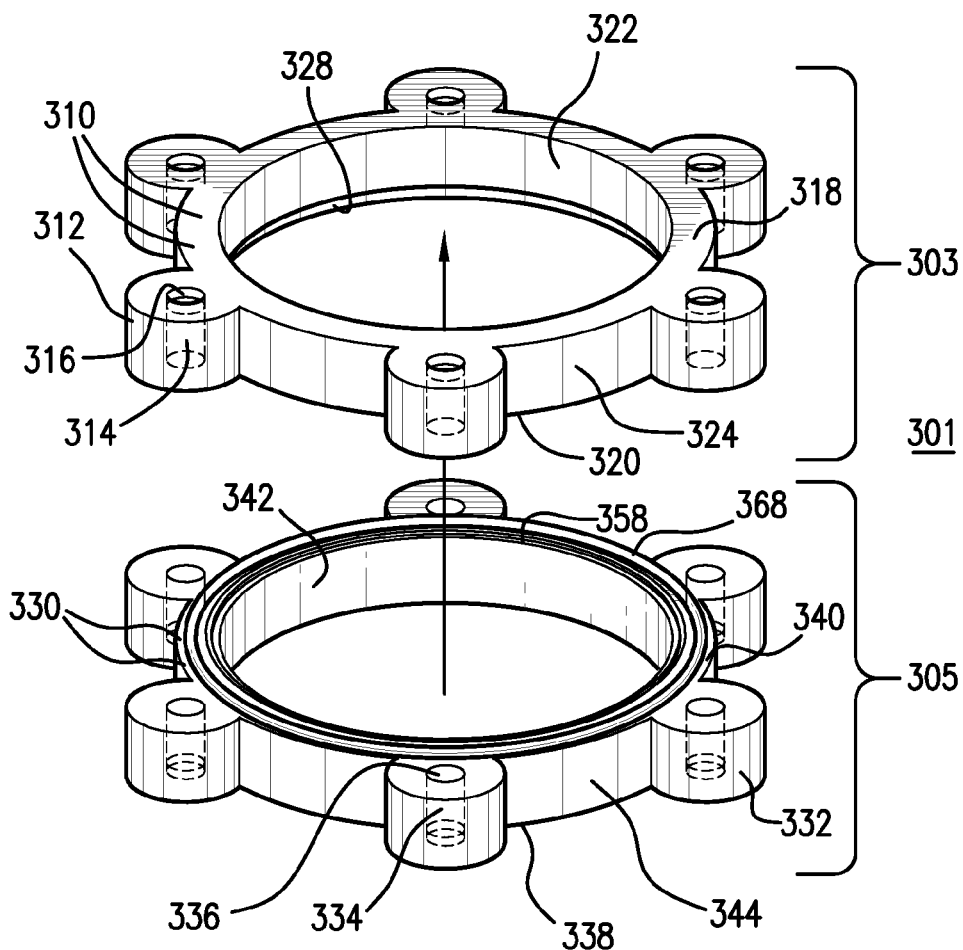
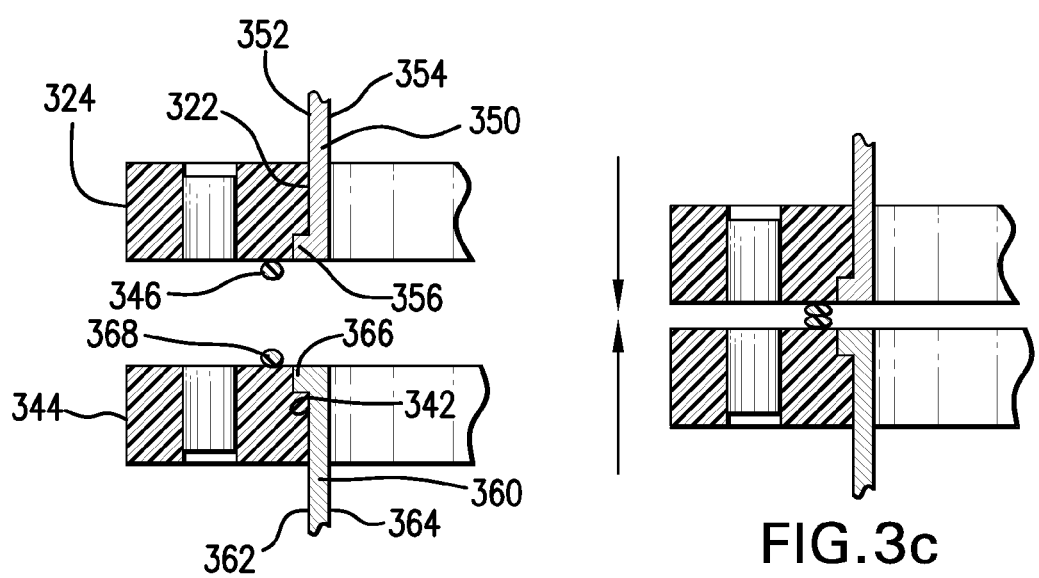
FIG.3a
FIG.3b
FIG.3c

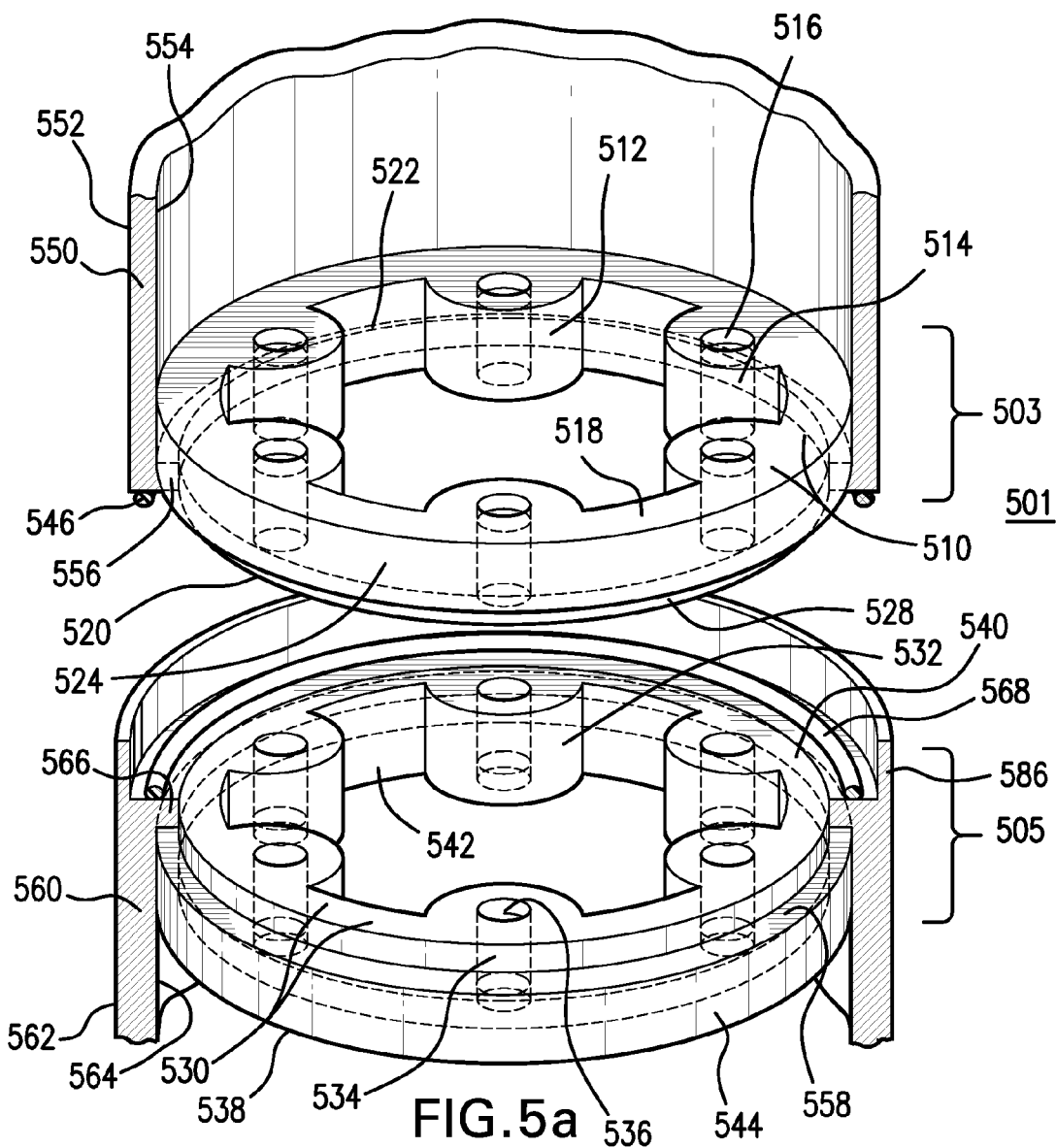
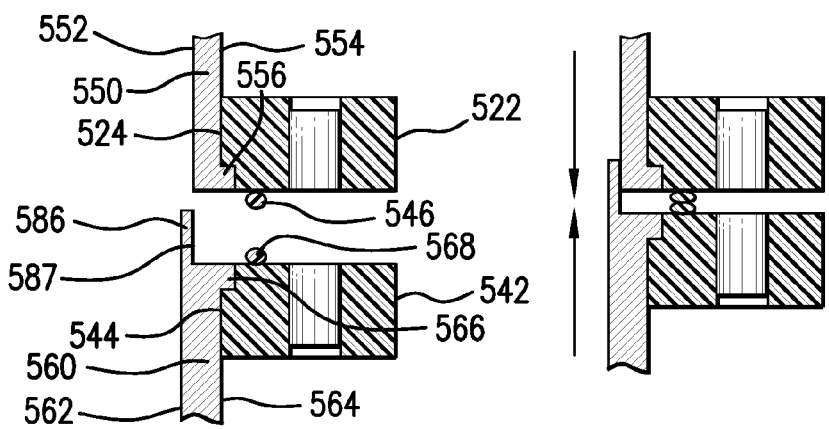
FIG.5a  FIG.5b  FIG.5c

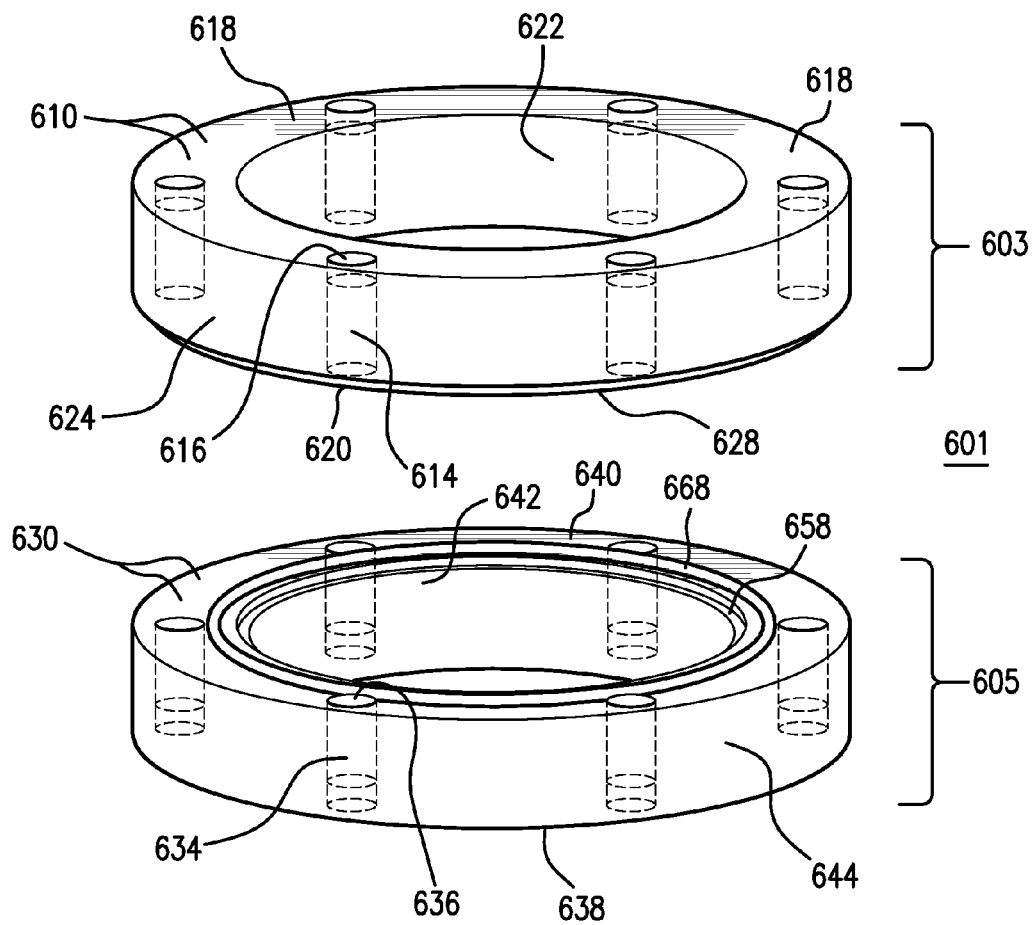
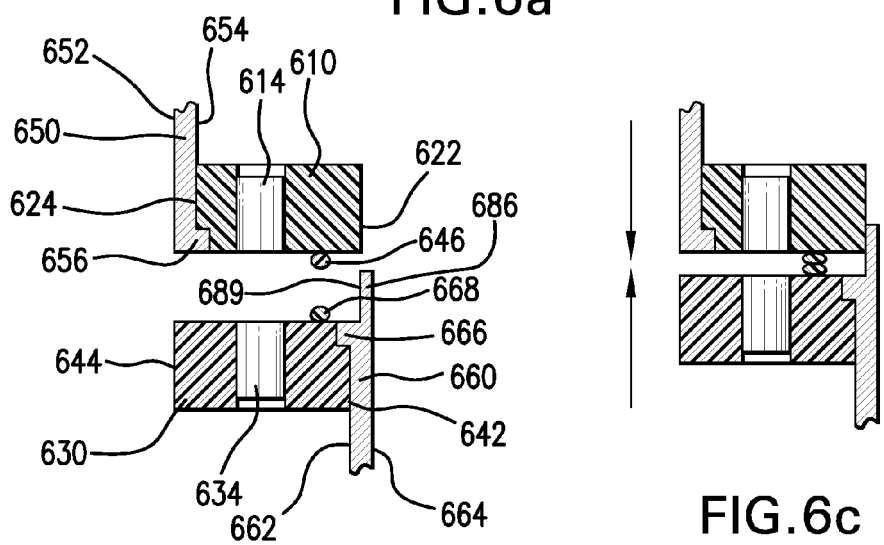
FIG.6a
FIG.6b
FIG.6c

MAGNETIC COUPLING DEVICE AND METHOD

CROSS-REFERENCE TO RELATED APPLICATIONS

This application makes reference to U.S. application Ser. No. 11/736,664, entitled "MAGNETICALLY COUPLED HUMIDIFIER CONTAINER COMPONENTS," filed Apr. 18, 2007. This application also makes reference to international PCT App. No. PCT/US08/59611, entitled "MAGNETICALLY COUPLED HUMIDIFIER CONTAINER COMPONENTS," filed Apr. 8, 2008. The entire disclosure and contents of the above applications are hereby incorporated by reference.

BACKGROUND

1. Field of the Invention

The present invention relates to a coupling means for joining two or more objects together using magnetic forces to allow reversible engagement of the two or more objects via magnets and/or metal members that may be spaced-apart around the exterior or interior perimeter of the two or more objects in a patterned arrangement to encourage a specific alignment or set of alignments between the objects.

2. Related Art

Most objects, such as lids/containers or other tubular objects or structures like pipes, hoses, etc., that need to be reversibly or releasably attached or joined use a threaded screwing mechanism or some other type of mechanical engagement, such as a snapping or a snug-fit mechanism relying exclusively on friction and/or physical constraint, between the two or more objects. Relatively few examples exist for reversibly joining or attaching two or more objects together using magnetic forces. Some common examples do exist, for example, with various types of handbags or device holders where two planar surfaces are joined. However, these articles typically rely on using corresponding magnets and/or metal pieces having a matching flat shape, such as a disk or annular ring. Since the contacting planar surfaces of these articles are typically positioned or aligned by some other form of fixed attachment, it is not important that the corresponding magnets or metal pieces encourage any particular alignment, thus allowing for simply symmetric coupling surfaces of the magnets and/or metal pieces, e.g., a disk or ring shape, to be used without any particular orientation. Furthermore, such articles tend to have their corresponding magnets and/or metal pieces integrated into the article itself with the intention that they be used over the life of the article.

While the use of a threaded screw-type mechanism to hold objects, such as containers and lids or tubular objects/structures, together are often sufficient and effective, the use of such threaded screw-type engagements also tends to be associated with several drawbacks. For example, the threads can become stripped and no longer promote a secure engagement, thus causing the threaded connection to leak fluid from an interior compartment of the connected objects. Corrosion may also cause deterioration of the physical contact between the two threaded engagements, thus leading to leakages as well. In addition, chemical deposition of materials between the threaded engagements may also bond the objects together making it difficult to overcome through manual force. Threaded engagements also run the risk of being overly tightened, and even when a threaded sections are properly engaged, persons experiencing muscle weakness or pain, such as by arthritis, may find it difficult to manually twist the objects together or apart.

Therefore, a need exists in the art for a means of coupling or joining two or more objects that allows for those objects to be easily and reversibly engaged and detached from one another. A need exists for a coupling means that is durable and capable of being removed from the two or more objects such that the coupling means may be reused to allow for the objects themselves to be discarded and replaced without risk of cross-contamination. A further need exists for a coupling means that may be adjustably designed so that the amount of force holding the two objects together is appropriately based on the types of objects and intended application and such that at least partial separation may occur when pressure within the objects exceeds a predetermined threshold. A yet further need exists in the art for a coupling means that encourages or forces the objects to succumb to one or more predetermined orientations or alignments in relation to one another. Finally, a need exists for a coupling means that holds the objects together while maintaining separation between the objects themselves such that the objects are electrically or otherwise isolated from each other.

SUMMARY

According to one broad aspect of the invention, a device and method for coupling two or more objects together is described using a coupling device comprising a first portion having at least one magnet; and a second portion having at least one corresponding metal piece, wherein said first portion is attached to a first object and positioned at or near the periphery of said first object, wherein said second portion is attached to a second object and positioned at or near the periphery of said second object, and wherein said first object and said second object are held together by magnetically attractive forces when said first portion and said second portion are engaged.

According to another broad aspect of the invention, a device and method for coupling two or more objects together is described using a coupling device comprising a first portion having at least one magnet; and a second portion having at least one corresponding magnet, wherein said first portion is attached to a first object and positioned at or near the periphery of said first object, wherein said second portion is attached to a second object and positioned at or near the periphery of said second object, and wherein said first object and said second object are held together by magnetically attractive forces when said first portion and said second portion are engaged.

According to another broad aspect of the invention, a device and method for coupling two or more objects together is described using a coupling device comprising a first object having at least one magnet integrated within said first object and positioned at or near the periphery of said first object; and a second object having at least one corresponding metal piece integrated within said second object and positioned at or near the periphery of said second object, wherein said first object and said second object are held together by magnetically attractive forces when said at least one magnet of said first object and said at least one corresponding metal piece of said second object are engaged.

According to another broad aspect of the invention, a device and method for coupling two or more objects together is described using a coupling device comprising a first object having at least one magnet integrated within said first object and positioned at or near the periphery of said first object; and a second object having at least one corresponding magnet integrated within said second object and positioned at or near the periphery of said second object, wherein said first object and said second object are held together by magnetically attractive forces when said at least one magnet of said first object and said at least one corresponding magnet of said second object are engaged.

According to another broad aspect of the invention, a device and method for coupling two or more objects together is described using a coupling device comprising a first object having at least one magnet integrated within said first object and positioned at or near the periphery of said first object; and a portion of said coupling device comprising a collar having at least one corresponding metal piece, wherein said collar is attached to a second object and positioned at or near the periphery of said second object, wherein said first object and said second object are held together by magnetically attractive forces when said at least one magnet of said first object and said at least one corresponding metal piece of said collar are engaged.

According to another broad aspect of the invention, a device and method for coupling two or more objects together is described using a coupling device comprising a first object having at least one magnet integrated within said first object and positioned at or near the periphery of said first object; and a portion of said coupling device comprising a collar having at least one corresponding magnet, wherein said collar is attached to a second object and positioned at or near the periphery of said second object, wherein said first object and said second object are held together by magnetically attractive forces when said at least one magnet of said first object and said at least one corresponding magnet of said collar are engaged.

According to yet another broad aspect of the invention, a device and method for coupling two or more objects together is described using a coupling device comprising a first object having at least one metal piece integrated within said first object and positioned at or near the periphery of said first object; and a portion of said coupling device comprising a collar having at least one corresponding magnet, wherein said collar is attached to a second object and positioned at or near the periphery of said second object, wherein said first object and said second object are held together by magnetically attractive forces when said at least one metal piece of said first object and said at least one corresponding magnet of said collar are engaged.

BRIEF DESCRIPTION OF THE DRAWINGS

The invention will be described in conjunction with the accompanying drawings, in which:

FIG. 1 shows one embodiment for coupling device of present invention having round and symmetrically spaced-apart magnets and/or metal pieces. FIG. 1a shows a first portion and a second portion of the coupling device disengaged and separated. FIG. 1b shows a cross section of first and second portions of the coupling device from FIG. 1a in the disengaged and separated position. FIG. 1c shows a cross section of first and second portions of the coupling device from FIG. 1a properly engaged and joined.

FIG. 3 shows one embodiment for coupling device of present invention having round and symmetrically spaced-apart magnets and/or metal pieces with an additional groove around the inner perimeter of first and second portions of coupling device. FIG. 3a shows first and second portions of coupling device disengaged and separated. FIG. 3b shows a cross-section of first and second portions of the coupling device from FIG. 3a in a disengaged and separated position with objects associated with both first and second portions. FIG. 3c shows a cross-section of first and second portions of coupling device from FIG. 3a properly engaged and joined with objects associated with both first and second portions.

FIG. 5 shows another embodiment for coupling device of present invention having a first portion and a second portion attached to an interior perimeter of two objects. FIG. 5a shows the first and second portions of coupling device in a disengaged and separated position. FIG. 5b shows a cross-section of first and second portions of coupling device shown in FIG. 5a disengaged and separated. FIG. 5c shows a cross-section of first and second portions of coupling device similar to FIG. 5b properly engaged and joined.

FIG. 6 shows another embodiment for coupling device of present invention having a first portion attached to an interior perimeter of one object and a second portion attached to an exterior perimeter of a second object. FIG. 6a shows first and second portions of coupling device in a disengaged and separated position. FIG. 6b shows a cross-section of first and second portions of coupling device shown in FIG. 6a disengaged and separated. FIG. 6c shows a cross-section of first and second portions of coupling device similar to FIG. 6b properly engaged and joined.

FIG. 7 shows an embodiment for coupling device of present invention having annular magnet(s) or metal piece(s) around an external perimeter of two objects.

FIG. 10 shows additional embodiments of coupling device of present invention having asymmetrically spaced-apart magnets and/or metal pieces.

FIG. 11 shows another set of embodiments for coupling device of present invention having additional means for securing or fastening first and second portions together.

DETAILED DESCRIPTION OF THE PREFERRED EMBODIMENTS

Definitions

Figure 2:
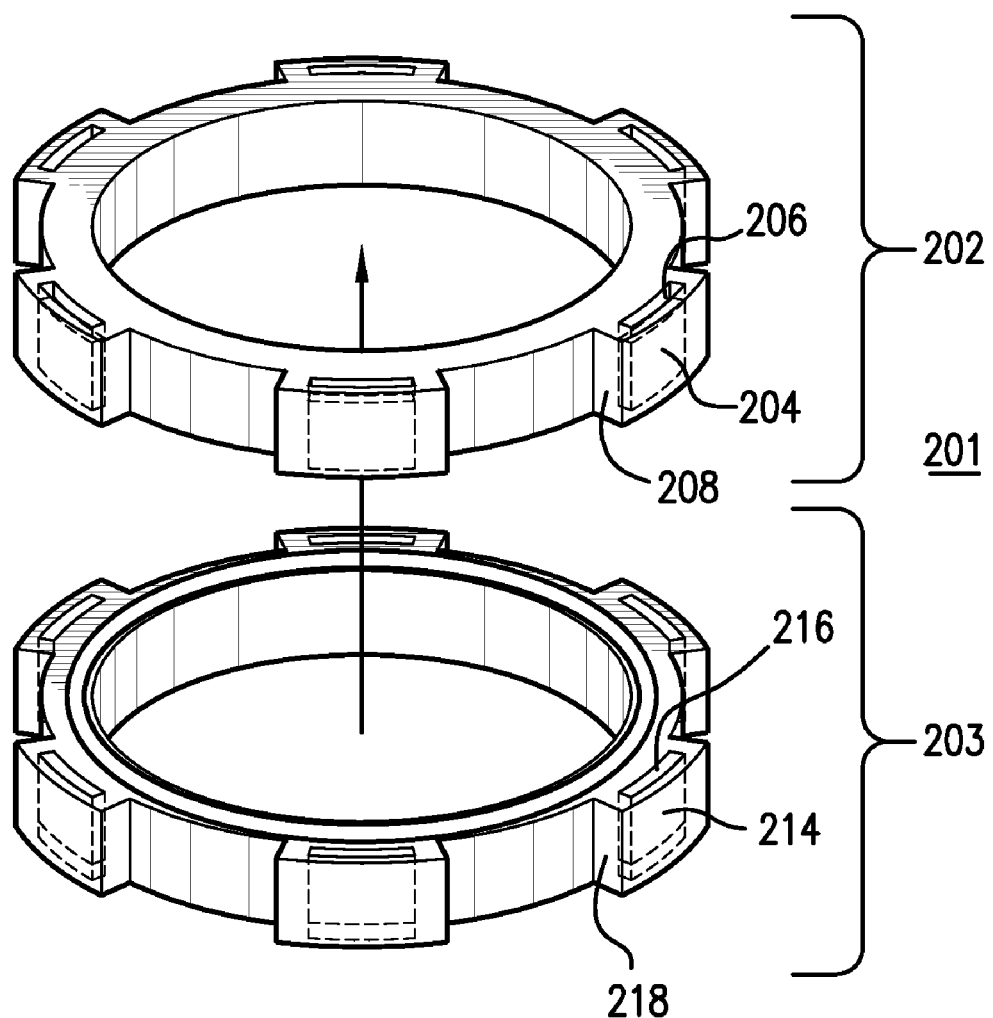
FIG. 2 shows another embodiment for coupling device of present invention with first portion and second portion having rectangular and symmetrically spaced-apart magnets and/or metal pieces.

It is advantageous to define several terms before describing the invention. It should be appreciated that the following definitions are used throughout this application.

For the purposes of the present invention, the term "spaced-apart" refers to the spacing between individual magnet(s) and/or metal piece(s) held by first or second portion of coupling device or integrated into objects themselves. Such spacing is generally along and near the periphery of objects to be joined. Such spacing may either be regular (i.e., approximately equal) or irregular (i.e., asymmetrically arranged with unequal spacing).

For the purposes of the present invention, the terms "object" or "objects" joined by coupling device of present invention generally refer to tubular objects that contain an interior hollow space or lumen. Tubular objects may include hoses, pipes, poles, etc. Such objects of present invention may have any cross-sectional shape, including regular or irregular polygons or any other appropriate closed curve, and each object may have different cross-sectional shapes at different positions along its length. Tubular objects joined by coupling device of present invention are further envisioned to include enclosed containers, such as a cup/vessel joined with a lid/cap or a cup/vessel joined with another cup/vessel. Such objects may be permanently or reversibly attached to coupling device. Alternatively, magnet(s) and/or metal piece(s) may be integrated into one or more of objects to be joined by coupling device. Such objects may be made of any metal, plastic, or polymeric material, or combination thereof.

For the purposes of the present invention, the terms "engage," "engaged," or "engagement" generally refer to the juxtaposition of components/portions of coupling device and objects themselves such that coupling device and/or objects are held together by magnetically attractive forces generated between magnet(s) and/or metal piece(s) of present invention. Magnet(s) and/or metal piece(s) may be present within portions of coupling device, or they may be integral to objects themselves.

For the purposes of the present invention, the terms "disengage," "disengaged," or "disengagement" generally have the opposite meaning compared to terms "engage," "engaged," or "engagement" and generally refer to the separation of components/portions of coupling device and objects themselves from each other. Such separation occurs by overcoming the magnetically attractive forces holding coupling device and objects together.

For the purposes of the present invention, the term "collar" generally refers to a piece of material, such as metal, plastic, or other polymeric material, that is used to hold magnet(s) and/or metal piece(s) for each portion(s) of coupling device that are associated or attached at or near the periphery of objects to be joined by coupling device. The shape of such collar generally corresponds to the cross-sectional shape of the periphery of objects to be joined. Such collar may have any shape, including regular or irregular polygons or any other appropriate closed curve, to accommodate the shapes of the objects to which it is associated or attached. Such collar may hold regularly or asymmetrically spaced-apart magnet(s) and/or metal piece(s) or a single annular magnet and/or piece of metal, as the case may be. Such collar may or may not have additional protrusions to hold magnet(s) and/or metal piece(s). Such collar may be designed to fit around either the internal or external surface of an object. Such collar may be made hollow to not interfere with the interior compartment or lumen of tubular objects to be joined, including containers and lids, or to fit around an external surface of an object.

For the purposes of the present invention, the terms "gasket" or "gaskets" generally refer to a mechanical seal that fills the space between portion(s) of coupling device and/or object(s) themselves. It is usually desirable that such gaskets be made from a material that is to some degree compressible such that it tightly fills space between portion(s) of coupling device and/or object(s), including any slight irregularities. Such gaskets generally prevent leakage from between portion(s) of coupling device and/or object(s) while under compression. Gaskets of present invention may be produced by cutting from sheet materials, such as gasket paper, rubber, silicone, metal, cork, felt, Neoprene, fiberglass, or a plastic polymer. However, gaskets of present invention may be produced according to any known method, including those for sheet gaskets, solid material gaskets, spiral wound gaskets, double jacketed gaskets, corrugated gaskets, etc.

Description

The coupling device of the present invention allows for two or more objects to be connected or attached using magnetically attractive forces. Where multiple spaced-apart magnets and/or metal pieces are used or where continuous or segmented magnet(s) and/or metal piece(s) are used, the amount and kind of attractive force(s) of the present invention produced by the magnet(s) and/or metal piece(s) to hold the two or more objects together may depend on a number of factors, including the relative number, position, size, shape, orientation, composition, density, etc. of each magnet and/or metal piece. By varying these factors, the magnetic coupling device can be tailored for specific applications.

In general, magnetically attractive forces are generated by either (i) electric currents, or (ii) materials having magnetic dipoles (or moments) as a result of intrinsic (or "spin") properties of charged particles within atoms. Magnets produced by electric current are collectively referred to as electromagnets, whereas materials having intrinsic magnetically attractive properties are generally classified as being either paramagnetic, ferromagnetic, or ferrimagnetic. Paramagnets typically refer to materials having atoms with unpaired electrons that become magnetized when placed in a magnetic field. However, because those unpaired electrons of paramagnetic materials generally orient themselves randomly and behave independently of their neighbors, most paramagnets remain only weakly magnetic even when placed in a magnetic field.

Most magnets commonly known and/or used commercially are ferromagnets (or ferrimagnets). Like paramagnets, ferromagnets generally have magnetic moments as a result of angular momentum of unpaired electrons. However, in contrast to paramagnets, ferromagnets also possess an exchange force that tends to orient the magnetic moments of neighboring atoms in parallel to create unified domains within ferromagnets having a net magnetic moment in a particular direction. A typical ferromagnet is composed of multiple domains having net magnetic moments pointing in varying directions with each domain separated from neighboring domains by domain walls. Ferrimagnets are similar to ferromagnets except that the material is generally composed of different sublattices having opposing magnetic moments. However, since the opposing moments are typically unequal, a net magnetization of the ferrimagnetic material generally remains.

Ferromagnets may be further classified as either (i) permanent (or hard) magnets, or (ii) temporary (or soft) magnets. Permanent magnets generally resist being magnetized and demagnetized, whereas temporary magnets are generally magnetized and demagnetized relatively easily. A number of factors determine whether a magnetic material has permanent or temporary magnetic properties, including for example the degree of anisotropy, size of crystals, and the amount of impurities. In general, ferromagnets that are more anisotropic, impure, and contain smaller crystals tend to have characteristics of permanent (or hard) magnets, and vice versa. The reason is that it is more difficult for the domain walls or boundaries to migrate through a "hard" ferromagnet in response to being placed in a magnetic field. Thus, permanent or hard magnets maintain their magnetization when removed from a magnetic field and resist becoming demagnetized even when placed in a magnetic field of opposite polarity. On the other hand, the domain walls of temporary (or soft) ferromagnetic materials are able to migrate more freely in response to a magnetic field. As a result, temporary ferromagnetic materials are capable of being magnetized in the presence of a magnetic field but generally lose their magnetization and become demagnetized when removed from a magnetic field.

The terms "piece of metal," "metal piece," and "metal pieces" of the present invention generally refer to compositions or alloys containing temporary (or soft) ferromagnetic (or ferrimagnetic) materials that are capable of becoming magnetized when placed in a magnetic field, such as when placed within close proximity of a permanent magnet, but generally lose their magnetism when removed from a magnetic field. Examples of temporary magnets may include compositions or alloys containing iron, steel, nickel, and/or cobalt. In appropriate circumstances, however, the terms "piece of metal," "metal piece," and "metal pieces" of the present invention may also refer to compositions or alloys containing paramagnetic materials.

Permanent magnets generally fall within four classes: (i) ceramic or ferrite magnets, (ii) alnico magnets, or (iii) rare-earth magnets. Ceramic, or ferrite, magnets comprise a class of chemical compounds with the formula $AB_2O_4$, where A and B represent various metal cations, usually including iron. Ferrite magnets are generally made of a sintered composite of powdered iron oxide and barium/strontium carbonate ceramic. Ceramic or ferrite magnets are generally inexpensive to produce and are generally non-corroding, but they are also brittle and subject to breaking.

Alnico magnets are made by casting or sintering a combination of aluminium, nickel and cobalt with iron and small amounts of other elements (such as copper or perhaps titanium) added to enhance the properties of the magnet. Alnico magnets resist corrosion and may be stronger than some ferrite magnets but are generally more expensive to produce. A related type of permanent magnet is a ticonal magnet, which generally comprises an alloy of titanium, cobalt, nickel, and aluminum, with iron and small amounts of other elements.

Rare-earth magnets are strong, permanent magnets made from alloys of rare earth elements. 'Rare earth' (lanthanoid) elements have a partially occupied f electron shell (which can accommodate up to 14 electrons). The spin of these electrons can be aligned, resulting in very strong magnetic fields, and therefore these elements are used in compact high-strength magnets. Rare-earth magnets are substantially stronger than ferrite or alnico magnets. The magnetic field typically produced by rare-earth magnets can be in excess of 1.2 Teslas. Ferrite or ceramic magnets typically exhibit fields of 50 to 100 milliTeslas (for conversion, 1 Tesla (T)=10,000 Gauss (G)). However, rare-earth magnets are generally expensive to produce. Because rare earth magnets are extremely brittle, they are usually nickel-coated to protect them from breaking, hence their typically shiny, corrosion resistant nature.

The most common types of rare earth magnets are samarium-cobalt and neodymium-iron-boron (NIB) magnets. Neodymium magnets, such as $Nd_2Fe_{14}B$, are the strongest and most affordable type of rare-earth magnet. They have the highest magnetic field strength, but are inferior to samarium-cobalt in resistance to oxidation and temperature. Samarium-cobalt magnets, such as $SmCo_5$, are less common than Neodymium magnets because they are more expensive to produce, create a weaker magnetic field than Neodymium magnets, and are brittle and prone to chipping and cracking. However, Samarium-cobalt magnets are superior at high temperatures and are highly resistant to oxidation. Furthermore, protective surface treatments such as gold, nickel, zinc and tin plating and epoxy resin coating may be used to provide corrosion protection where required.

For purposes of the present invention, the terms "magnet" or "magnets" generally refer to compositions or alloys containing permanent magnets, such as ferromagnets (or ferrimagnets), and may include, for example, ceramic or ferrite magnets, alnico magnets, and/or rare-earth magnets as described above. In addition, however, the terms "magnet" or "magnets" of the present invention may also refer to electromagnets in appropriate circumstances.

An electromagnet is typically created by forming a tightly-wound solenoid or helical coil of wire; however, other arrangements may be possible. The electromagnet behaves like a permanent magnet when current is flowing through the wire with the strength and polarity of the electromagnet depending on the magnitude and direction of the current as well as the construction and composition of the wire. Electromagnets often contain a soft magnetic core material inside the helical coil of wire to greatly amplify the strength of the magnetic field by magnetizing the soft magnetic material due to its permeability.

The magnet(s) and/or metal piece(s) of the present invention may be made to form any shape or size and may comprise an alloy, composite, mixture, or any other composition containing appropriate permanent and/or temporary magnetic material(s). The magnet(s) and/or metal piece(s) may be sintered, injection-molded, or formed according to any known method manufacture. The magnet(s) and/or metal piece(s) may also be made into a flexible material where appropriate. The magnet(s) and/or metal piece(s) of the present invention may further contain non-magnetic materials, such as resins or polymeric materials, and magnet(s) of the present invention may further contain soft magnetic material(s). Of course, the same generalizations may apply where an annular magnet(s) and/or an annular piece of metal are used.

By altering the number, position, size, shape, strength, orientation, type, composition, density, etc. of magnet(s) and/or metal piece(s) in relation to one another, coupling device of present invention may be designed and customized to suit particular applications. In general, the magnet(s) and/or metal piece(s) of coupling device are positioned at or near the periphery of two or more objects joined. Magnet(s) and/or metal piece(s) of coupling device may be placed around an external and/or an internal perimeter of such objects, or they may be integral thereto. Such objects themselves joined by coupling device may be any size or shape, and arrangement of magnet(s) and/or metal piece(s) as well as coupling device as a whole may be designed to accommodate or correspond to size and shape of two or more objects joined. Of course, the same generalizations may apply where an annular magnet(s) and/or an annular piece of metal are used.

According to one embodiment of the invention, FIG. 1 shows a coupling device 101 having a first portion 103 and a second portion 105. FIG. 1a shows first portion 103 and second portion 105 separated and disengaged. First portion 103 is shown having a collar 110 with protrusions 112 to hold magnets and/or metal pieces 114 in holes 116 positioned within protrusions 112. First portion 103 is shown with distal surface 118 facing away from second portion 105 and proximal surface 120 facing toward second portion 105.

FIG. 1a shows second portion 105 having a collar 130 with protrusions 132 to hold magnets and/or metal pieces 134 in holes 136 positioned within protrusions 132. Second portion 105 is shown with distal surface 138 facing away from first portion 103 and proximal surface 140 facing toward first portion 103. Proximal surface 140 of second portion 105 may have a gasket 156 facing toward first portion 103. First portion 103 may also have a gasket on its proximal surface 120 facing toward second portion 105 (not shown).

FIG. 1b shows a cross section view of the coupling device 101 shown in FIG. 1a with objects attached. FIG. 1b shows first portion 103 and second portion 105 disengaged as before. First portion 103 is further shown attached to a first object 150 with external surface 152 of first object 150 in contact with inner surface 122 of first portion 103. External surface 152 of first object 150 may be optionally adhered to inner surface 122 of first portion 103 with an adhesive (not shown). First portion 103 may have a gasket 146 attached to its proximal surface 120 facing toward second portion 105.

In FIG. 1b, second portion 105 is shown attached to a second object 160 with external surface 162 of second object 160 in contact with inner surface 142 of second portion 103. External surface 162 of second object 160 may be optionally adhered to inner surface 142 of second portion 105 with an adhesive (not shown). A gasket 156 is shown on proximal surface 140 of second portion 105 facing toward first portion 103.

FIG. 1c shows a cross section view of coupling device 101 as shown in FIG. 1b but with coupling device 101 engaged. First object 150 and second object 160 are held together by magnetically attractive forces generated by interactions of magnets and/or metal pieces 114, 134 of first portion 103 and second portion 105, respectively. Gaskets 146, 156 are depressed by compaction as a result of magnetically attractive forces between magnets and/or metal pieces 114, 134 when first portion 103 and second portion 105 are engaged.

Although FIG. 1 shows magnets and/or metal pieces 114, 134 of first portion 103 and second portion 105 at approximately equal intervals, it is to be understood that magnets and/or metal pieces of coupling device of present invention may be irregularly and/or asymmetrically spaced. The magnets and/or metal pieces may have any size and may be positioned anywhere within first and second portions of coupling device. For example, magnets and/or metal pieces may be positioned within collar itself, thus eliminating any need for protrusions as part of either or both upper portion and/or lower portion. The only limitation is that magnets and/or metal pieces must be sized and positioned appropriately within upper portion and lower portion such that sufficient magnetically attractive forces are generated to hold first object and second object together as desired.

The overall shape of upper portion 103 and lower portion 105 of coupling device 101 is shown in FIG. 1 as being circular. However, it should be understood that, depending on the shape of objects joined by coupling device, upper portion and lower portion of coupling device may have any shape, including regular or irregular polygons or any other appropriate closed curve, to accommodate the shapes of the objects.

Magnets and/or metal pieces themselves may also have any dimension or shape. For example, according to one embodiment shown in FIG. 2, magnets and/or metal pieces 204, 214 may be rectangular in shape and placed in similarly shaped holes 206, 216 of coupling device 201. Such holes may exist within protrusions 208, 218 of first portion 202 and second portion 203 of coupling device 201.

The coupling device of the present invention may further comprise a ridge and groove structure as a means for attaching (or strengthening attachment between) first portion and second portion to first object and second object, respectively. For example, according to some embodiments of the present invention as shown in FIG. 3a, first portion 303 of coupling device 301 has a groove 328 on proximal surface 320 of collar 310, and second portion 305 has a groove 358 on proximal surface 340 of collar 330. As shown in cross-section in FIG. 3b, first object 350 comprises a ridge 356 that mates with groove 328 of first portion 303 of coupling device 301. Likewise, second object 360 also comprises a ridge 366 that mates with groove 358 of second portion 305 of coupling device 301.

The reversible attachment between ridge 356 of first object 350 and groove 328 of first portion 303 of coupling device 301 and between ridge 366 of second object 360 and groove 358 of second portion 305 of coupling device 301 may be achieved by "slip-fit" frictional forces. Such "slip-fit" attachment mechanism may exist between inner surface 322 of first portion 303 and external surface 352 of first object 350. Likewise, such "slip-fit" frictional attachment mechanism may exist between inner surface 342 of second portion 305 and external surface 362 of second object 360. In addition, attachment via such "slip-fit" frictional forces may be supplemented by application of an adhesive.

FIG. 3c shows a cross section view of coupling device 301 as shown in FIG. 3b but with coupling device 301 engaged. First object 350 and second object 360 are held together by magnetically attractive forces generated by interactions of magnets and/or metal pieces 314, 334 of first portion 303 and second portion 305, respectively. Gaskets 346, 368 are depressed by compaction as a result of magnetically attractive forces from magnets and/or metal pieces 314, 334 when first portion 303 and second portion 305 are engaged.

Figures 3D, 3E:
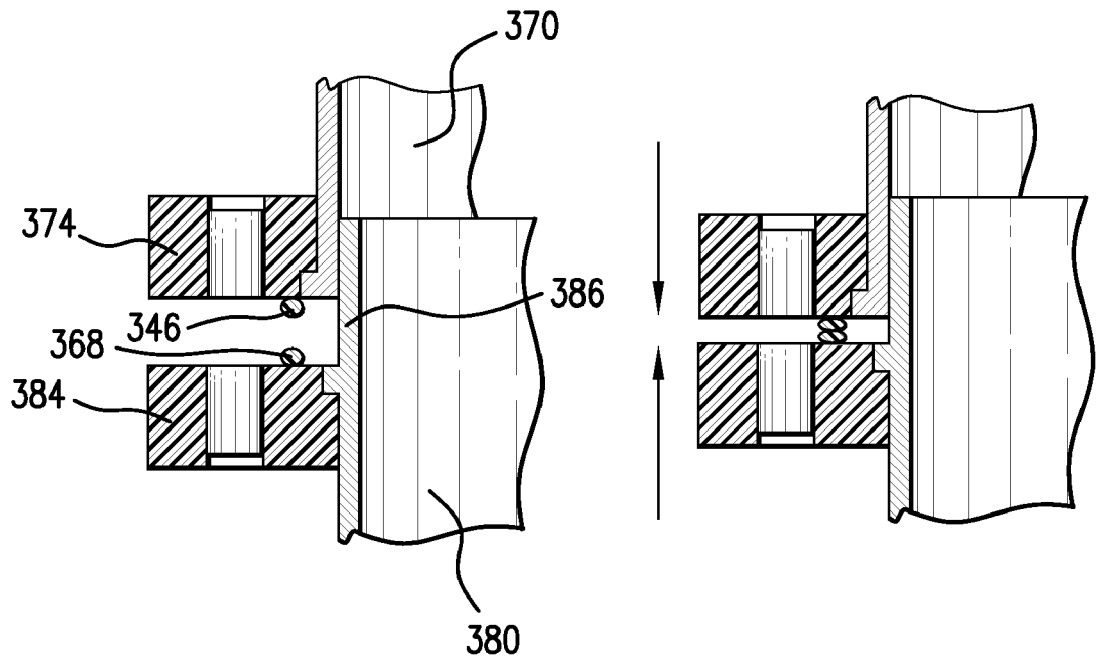
FIG. 3d shows a cross section of an alternative arrangement for first and second portions of coupling device associated with objects with an additional flange on object and with coupling device disengaged and separated.
FIG. 3e shows a cross section of first and second portions of FIG. 3d properly engaged and joined.

FIG. 3d shows a cross-section for an alternative arrangement similar to FIG. 3b with the addition of a flange 386 to second object to help guide and possibly secure engagement of first portion 374 and second portion 384 of coupling device. As shown, the relative size of first portion 374 and second portion 384 are adjusted so that first portion 374 attached to first object may fit around flange 386 of second object 380. However, it should be understood that different and/or opposing orientations are possible. For example, flange may be attached to first object instead (not shown). In addition, flanges may also extend from either or both first portion or second portion of coupling device (not shown).

Figures 3F, 3G:
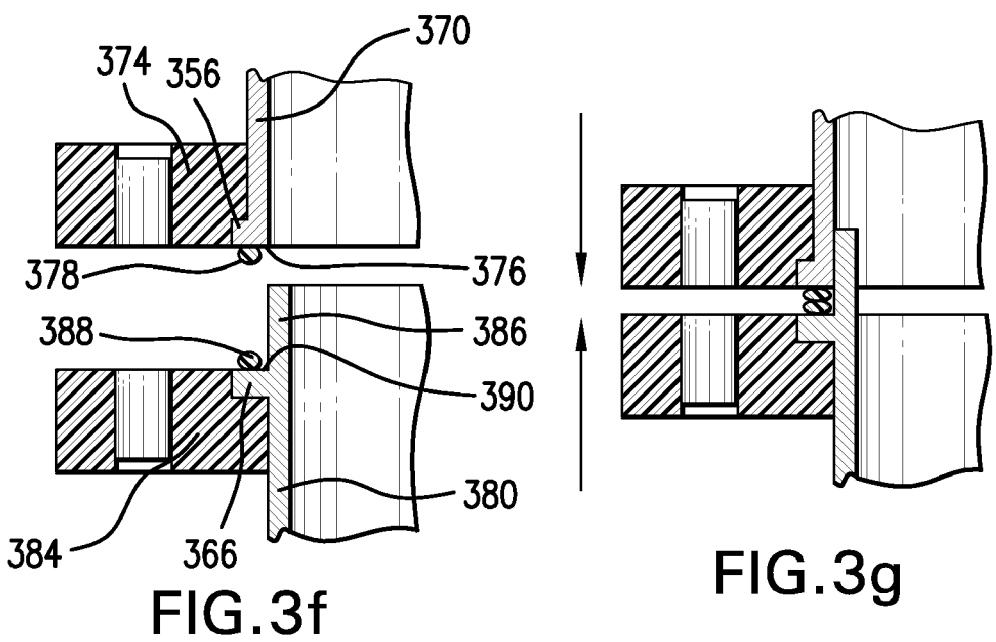
FIG. 3f shows a cross-section of another embodiment of coupling device similar to FIG. 3d with coupling device disengaged and separated but with gaskets on surface of objects.
FIG. 3g shows a cross section of first and second portions of coupling device shown in FIG. 3f properly engaged and joined.

It should also be understood that gaskets may be placed on objects themselves. For example, FIGS. 3f and 3g shows a cross-section of a coupling device similar to the one shown in FIGS. 3d and 3e with the exception that gaskets 378, 388 are placed on proximal surfaces 376, 390 of first object 370 and second object 380. Ridge 366 of second object 380 is shown extended (relative to FIGS. 3d and 3e) to accommodate gasket 388. FIG. 3f shows cross-section of the coupling device with first portion 374 and first object 370 separated and disengaged from second portion 384 and second object 380, whereas FIG. 3g shows first portion 374 and second portion 384 engaged and holding first object 370 and second object 380 together.

Objects of the present invention may include a variety of tubular objects. Such tubular objects generally include objects that are hollow or contain a lumen. For example, tubular objects may include hoses, pipes, poles, etc. The cross-section of tubular objects joined by the coupling device of the present invention may theoretically have any size or shape, including regular or irregular polygons or any other appropriate closed curve shape as described above. In addition, the cross-sectional shape of the objects may be different at different positions along their length. However, first and second portions of coupling device must be attached to objects such that coupling device is able to become engaged.

Figure 4:
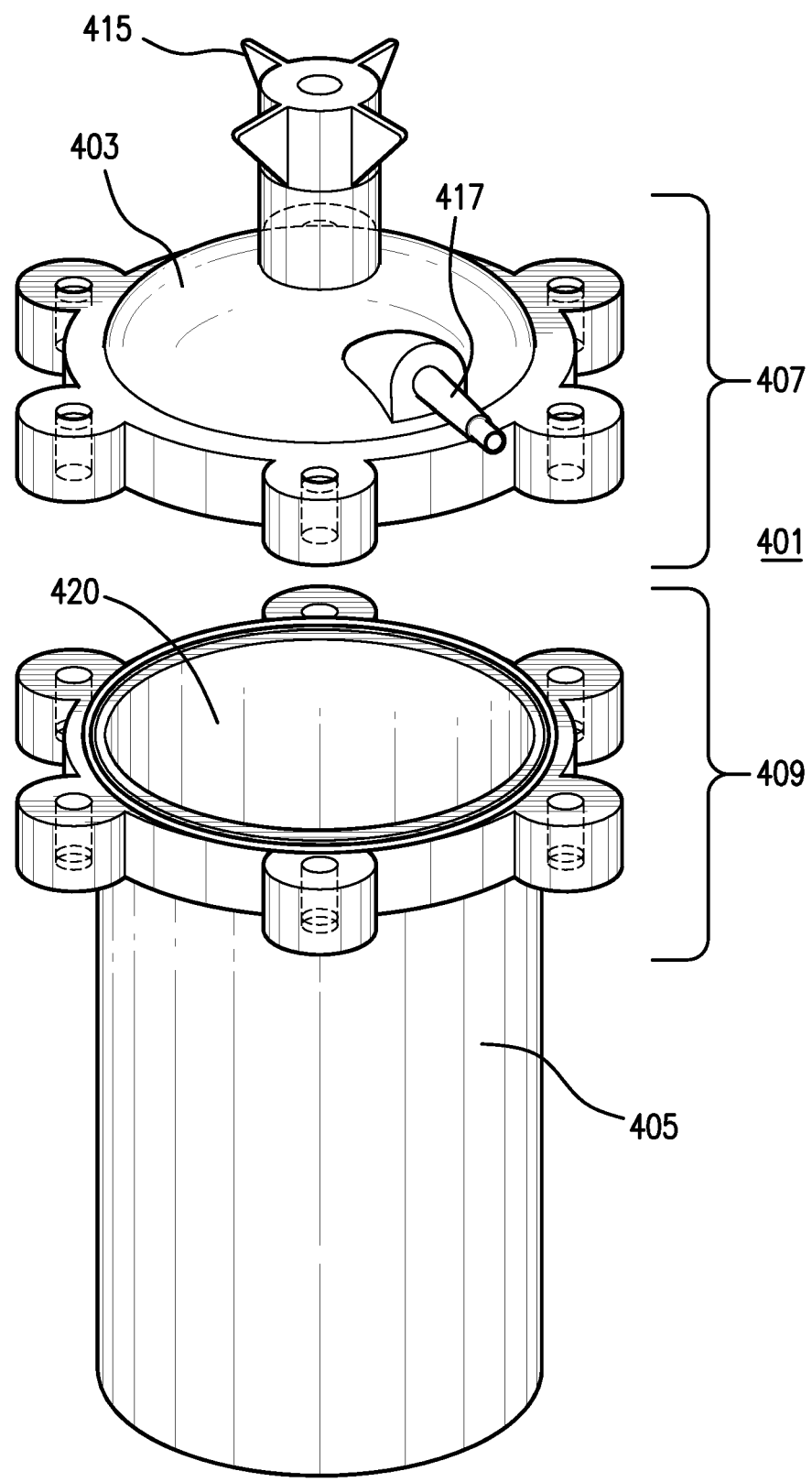
FIG. 4 shows an embodiment of coupling device of present invention with first and second portions of coupling device associated with objects comprising a container and lid.

Tubular objects joined by coupling device of present invention may also include closed ended objects, such as a container and a lid. According to one embodiment of the invention, FIG. 4 shows a coupling device 401 for holding a lid 403 and a container 405 together. In this particular example, the objects comprise a lid and a container to serve as a humidifier container with an input hookup 415 and an output hookup 417 incorporated into lid 403 such that gas passing through closed humidifier container may be humidified by water or fluid present in humidifier container. Lid 403 is shown attached to a first portion 407 of coupling device 401, and container 405 is shown attached to a second portion 409 of coupling device 401. Engagement of first portion 407 with second portion 409 of coupling device 401 encloses a volume 420 inside lid 403 and container 405 through magnetically attractive forces. The coupling device 401 shown in FIG. 4 for the humidifier container is similar in cross-section to coupling device depicted in FIG. 3d and FIG. 3e.

Although FIG. 1 through FIG. 4 depict first portion and second portion of coupling device attached to external surfaces or exterior of objects, first portion and/or second portion of coupling device may also have an inverted arrangement and may be attached to an internal surface or interior of objects. For example, FIG. 5a shows a coupling device 501 with outer surface 524 of first portion 503 attached to internal surface 554 of first object 550 and with outer surface 544 of second portion 505 attached to internal surface 564 of second object 560 with first portion 503 and second portion 505 disengaged and separated. Accordingly, magnet(s) and/or metal piece(s) 514, 534 are shown near internal surfaces 554, 564 of objects 550, 560.

First object 550 is further shown with a ridge 556 that is designed to mate with groove 528 on proximal surface 520 of collar 510 of first portion 503. Likewise, second object 560 is shown with a ridge 566 that is designed to mate with groove 558 on proximal surface 540 of collar 530 of second portion 505. In this way, first portion 503 and second portion 505 of coupling device 501 may be attached and held to first object 550 and second object 560, respectively, using "slip-fit" frictional forces. In addition, such slip-fit frictional forces may be reinforced by application of an adhesive (not shown). Second object 560 is also shown with flange 586 that may be optionally present to guide and stabilize coupling device 501 when engaged.

FIG. 5b shows a close-up cross-sectional view of coupling device 501 attached to objects 550, 560 when disengaged and separated and taken from a plane near protrusions 512, 532. FIG. 5c shows a similar cross-sectional view of coupling device 501 attached to objects 550, 560 as shown in FIG. 5b properly engaged. In this example, flange 586 guides and stabilizes engagement of coupling device 501 by contact between internal surface 587 of flange 586 and external surface 552 of first object 550. One or more gaskets may also be present on opposing surfaces of object(s) and/or portion(s) of coupling device. In this example, gaskets 546, 568 are shown on proximal surfaces 520, 540 of first portion 503 and second portion 505 of coupling device 501, such that gaskets 546, 568 become depressed under magnetically attractive forces when coupling device 501 is engaged.

Although magnet(s) and/or metal piece(s) 514, 534 are shown in protrusions 512, 532 of collar 510, 530 of first and second portions 503, 505, it is to be understood that such protrusions 512, 532 are optional, and magnet(s) and/or metal piece(s) 514, 534 may instead be placed in collar 510, 530 of first and second portions 503, 505. Although magnet(s) and/or metal piece(s) 514, 534 are shown regularly spaced-apart, such magnet(s) and/or metal piece(s) 514, 534 may also be irregularly spaced. Although flange 586 is shown as a part of second object 560 and near external surface 552 of first object 550 when engaged, a flange may alternatively be placed on first object 550 or first portion 503 or second portion 505 of coupling device 501 in any acceptable orientation.

Although FIG. 1 through FIG. 5 depict first portion and second portion of coupling device attached to either internal or external surfaces of objects, first portion and second portion of coupling device may instead be attached to different and/or opposite surfaces of objects. For example, FIG. 6a shows a coupling device 601 having a first portion 603 designed to attach to a first object 650 on the internal surface 654 of first object 650 and a second portion 605 designed to attach to a second object 660 on the external surface 662 of second object 660. In this view, first portion 603 and second portion 605 of coupling device 601 are shown disengaged and separated.

FIG. 6b shows a close-up cross-sectional view of first portion 603 of coupling device 601 attached to a first object 650 and second portion 605 of coupling device 601 attached to a second object 660 when coupling device 601 is disengaged and separated. According to this embodiment of the invention, outer surface 624 of first portion 603 is shown attached to internal surface 654 of first object 650 with magnet(s) and/or metal piece(s) 614, 634 positioned near internal surface 654 of first object 650. However, in contrast to first portion 603, FIG. 6b also shows inner surface 642 of second portion 605 attached to external surface 662 of second object 660 with magnet(s) and/or metal piece(s) 614, 634 positioned near external surface 662 of second object 660.

First object 650 is further shown with a ridge 656 that is designed to mate with groove 628 at corner of proximal 620 and outer 624 surfaces of collar 610 of first portion 603. In contrast, second object 660 is shown with a ridge 666 that is designed to mate with groove 658 at corner of proximal 640 and inner 642 surfaces of collar 630 of second portion 605. In this way, first portion 603 and second portion 605 of coupling device 601 may be attached and held to first object 650 and second object 660, respectively, using "slip-fit" frictional forces. In addition, such slip-fit frictional forces may be reinforced by application of an adhesive (not shown). Second object 660 is also shown with flange 686 that may be optionally present to guide and stabilize coupling device 601 when engaged.

FIG. 6c shows a similar cross-sectional view of coupling device 601 attached to objects 650, 660 as shown in FIG. 6b properly engaged. In this example, flange 686 guides and stabilizes engagement of coupling device 601 by contact between external surface 689 of flange 686 and inner surface 622 of first portion 603. One or more gaskets may also be present on opposing surfaces of object(s) and/or portion(s) of coupling device. In this example, gaskets 646, 668 are shown on proximal surfaces 620, 640 of first portion 603 and second portion 605 of coupling device 601, such that gaskets 646, 668 become depressed under magnetically attractive forces when coupling device 601 is engaged.

Although magnet(s) and/or metal piece(s) 614, 634 are shown regularly spaced-apart, such magnet(s) and/or metal piece(s) 614, 634 may also be irregularly spaced. Although flange 686 is shown as a part of second object 660 and near inner surface 622 of first portion 603 when engaged, a flange may alternatively be placed on either first object 650 or second object 660 or first portion 603 or second portion 605 of coupling device 601 in any acceptable orientation.

Figure 7A:
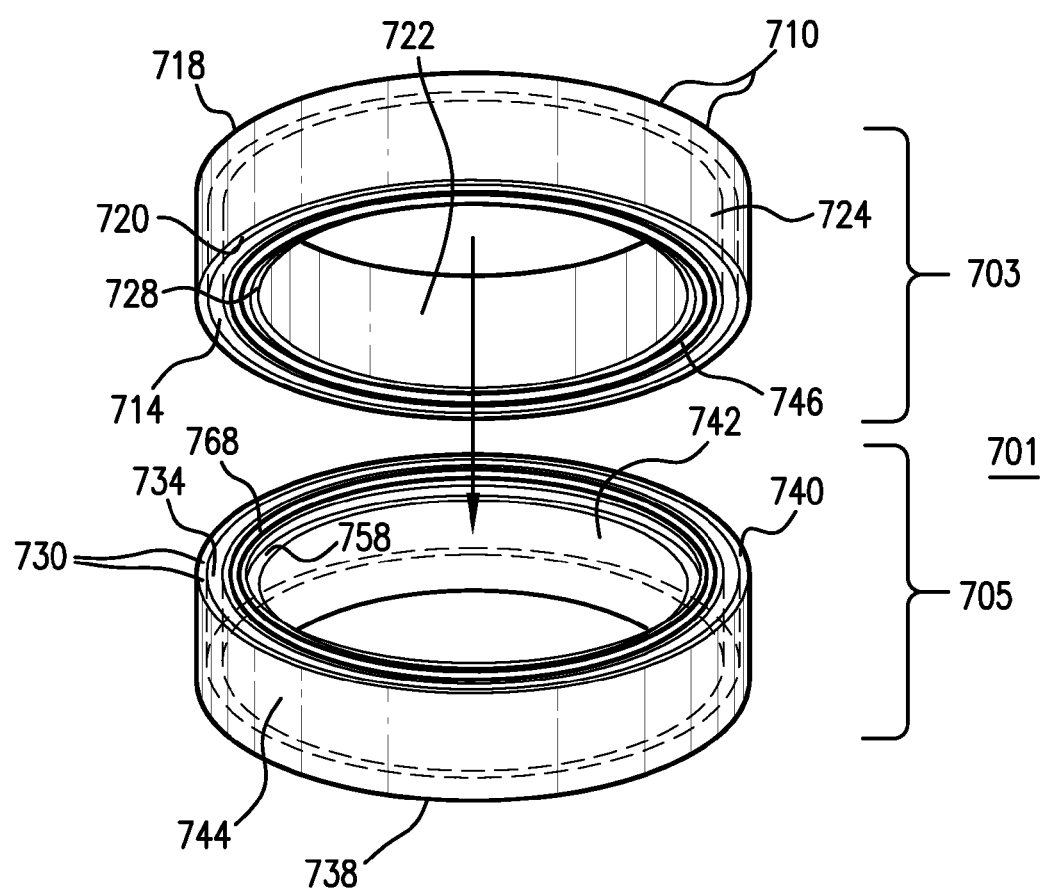
FIG. 7a shows first portion and second portion of the coupling device disengaged and separated.

Although FIG. 1 through FIG. 6 depict first portion and second portion of coupling device containing a plurality of spaced-apart magnet(s) and/or metal piece(s), it is to be understood that coupling device of present invention may also contain singular annular magnet(s) and/or metal piece(s). For example, FIG. 7a shows first portion 703 and second portion 705 of coupling device 701 having annular magnet(s) and/or metal piece(s) 714, 734. First portion 703 is designed to attach to a first object 750, and second portion 705 is designed to attach to a second object 760. In this view, first portion 703 and second portion 705 of coupling device 701 are shown disengaged and separated.

Figure 7B:
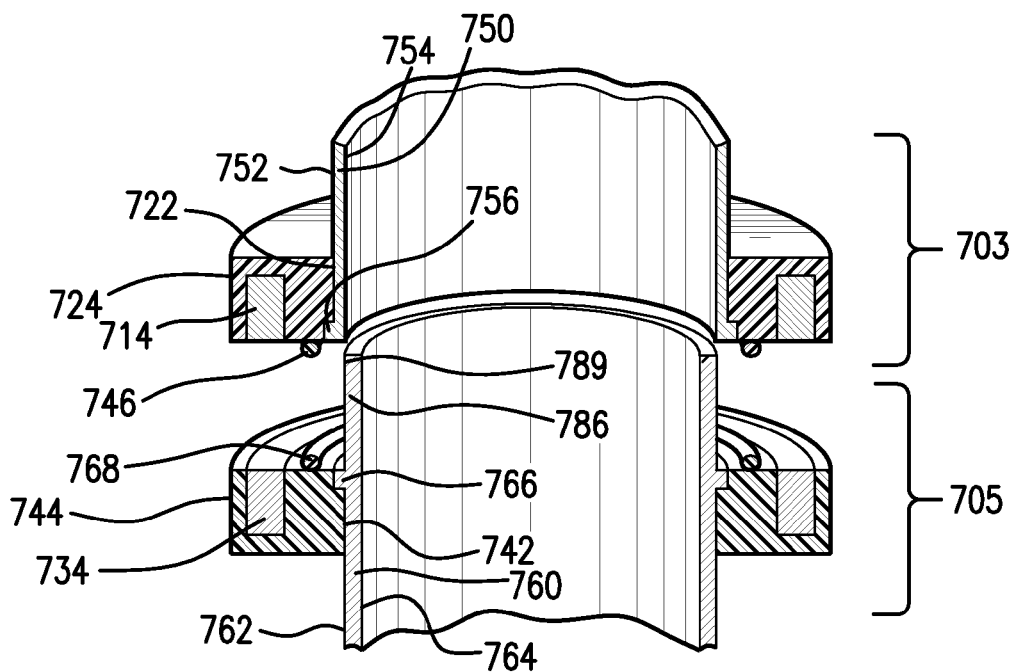
FIG. 7b shows a cross-section of first portion and second portion of the coupling device attached to objects disengaged and separated.

FIG. 7b shows a close-up cross-sectional view of first portion 703 of coupling device 701 attached to a first object 750 and second portion 705 of coupling device 701 attached to a second object 760 when coupling device 701 is disengaged and separated. According to this embodiment of the present invention, orientation and position of first portion and second portion of coupling device relative to first object and second object are similar to cross-section shown in FIG. 3d with the exception that each magnet(s) and/or metal piece(s) 714, 734 present within first portion 703 and second portion 705 comprise an annular magnet and/or metal piece 714, 734. Although each magnet and/or metal piece 714, 734 in FIG. 7 is shown as a single annular magnet and/or metal piece 714, 734, it is to be understood that annular magnet and/or metal piece 714, 734 may be further segmented into multiple magnet(s) and/or metal piece(s) (not shown). Furthermore, even when a singular continuous annular magnet and/or metal piece is used, multiple continuous annular magnet(s) and/or metal piece(s) may be stacked along proximal-distal axis of coupling device (not shown).

First object 750 is shown with a ridge 756 that is designed to mate with groove 728 at corner of proximal 720 and inner 722 surfaces of collar 710 of first portion 703. Likewise, second object 760 is shown with a ridge 766 that is designed to mate with groove 758 at corner of proximal 740 and inner 742 surfaces of collar 730 of second portion 705. In this way, first portion 703 and second portion 705 of coupling device 701 may be attached and held to first object 750 and second object 760, respectively, using "slip-fit" frictional forces. In addition, such slip-fit frictional forces may be reinforced by application of an adhesive (not shown). Second object 760 is also shown with flange 786 that may be optionally present to guide and stabilize coupling device 701 when engaged.

Figure 7C:
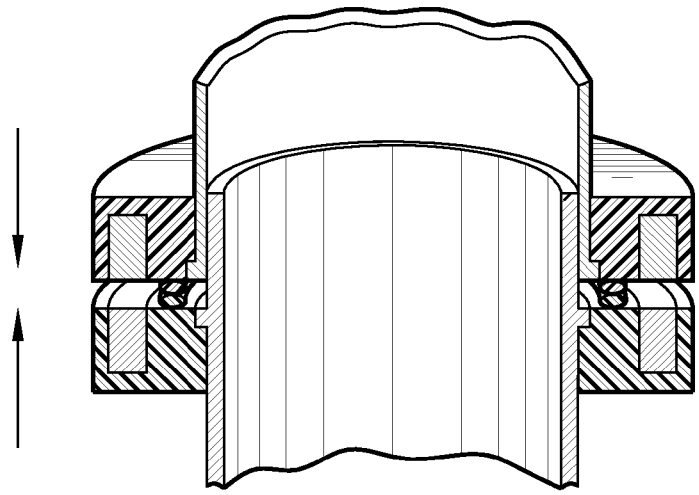
FIG. 7c shows a cross-section of first and second portions of coupling device attached to objects from FIG. 7b properly engaged and joined.

FIG. 7c shows a similar cross-sectional view of coupling device 701 attached to objects 750, 760 as shown in FIG. 7b properly engaged. In this example, flange 786 guides and stabilizes engagement of coupling device 701 by contact between external surface 789 of flange 786 and internal surface 754 of first object 750. Although flange 786 is shown as a part of second object 760 and near internal surface 754 of first object 750 when engaged, a flange may alternatively be placed on first object 750 or first portion 703 or second portion 705 of coupling device 701 in any acceptable orientation. One or more gaskets may also be present on opposing surfaces of object(s) and/or portion(s) of coupling device. In this example, gaskets 746, 768 are shown on proximal surfaces 720, 740 of first portion 703 and second portion 705 of coupling device 701, such that gaskets 746, 768 become depressed under magnetically attractive forces when coupling device 701 is engaged.

Figure 8:
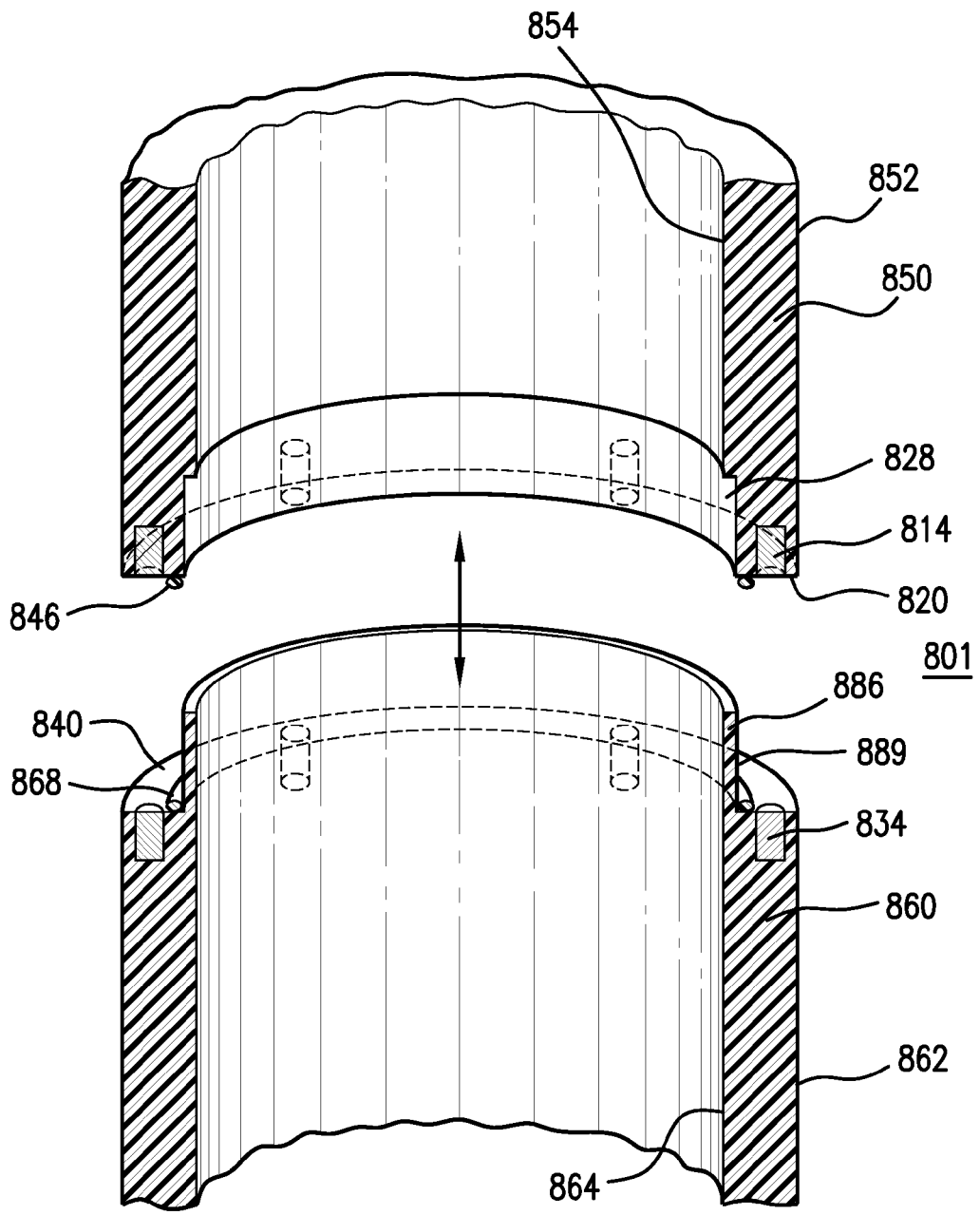
FIG. 8 shows a three-dimensional cross-section of another embodiment for coupling device of present invention having magnet(s) and/or metal piece(s) integrated into objects themselves to be joined. First and second objects are shown disengaged and separated but positioned for engagement by moving first object and second object together.

Although FIG. 1 through FIG. 7 generally describe magnet(s) and/or metal piece(s) as part of a first or a second portion of coupling device of present invention, it is to be understood that coupling device of present invention may further comprise objects themselves to be joined, and magnet(s) and/or metal piece(s) of present invention may be integrated into such objects to be joined. For example, FIG. 8 shows magnet(s) and/or metal piece(s) 814, 834 integrated within first object 850 and second object 860, such that first object 850 and second object 860 may be held together by magnetically attractive forces when properly engaged. In this example, a flange 886 is further shown as a part of second object 860 to guide and stabilize engagement of first object 850 and second object 860 by contact between external surface 889 of flange 886 with groove 828 on internal surface 854 of first object 850. One or more gaskets may also be present on opposing surfaces of object(s). In this example, gaskets 846, 868 are shown on proximal surfaces 820, 840 of first object 850 and second object 860 of coupling device 801, such that gaskets 846, 868 become depressed under magnetically attractive forces when coupling device 801 is engaged.

Although flange 886 is shown as a part of second object 860 and near internal surface 854 of first object 850 when engaged, a flange may alternatively be placed on either first object 850 or second object 860 in any acceptable orientation. Although magnet(s) and/or metal piece(s) 814, 834 are shown regularly spaced-apart, such magnet(s) and/or metal piece(s) 814, 834 may alternatively be irregularly spaced. In addition, such magnet(s) and/or metal piece(s) 814, 834 may each comprise a single annular magnet and/or metal piece.

Figure 9:
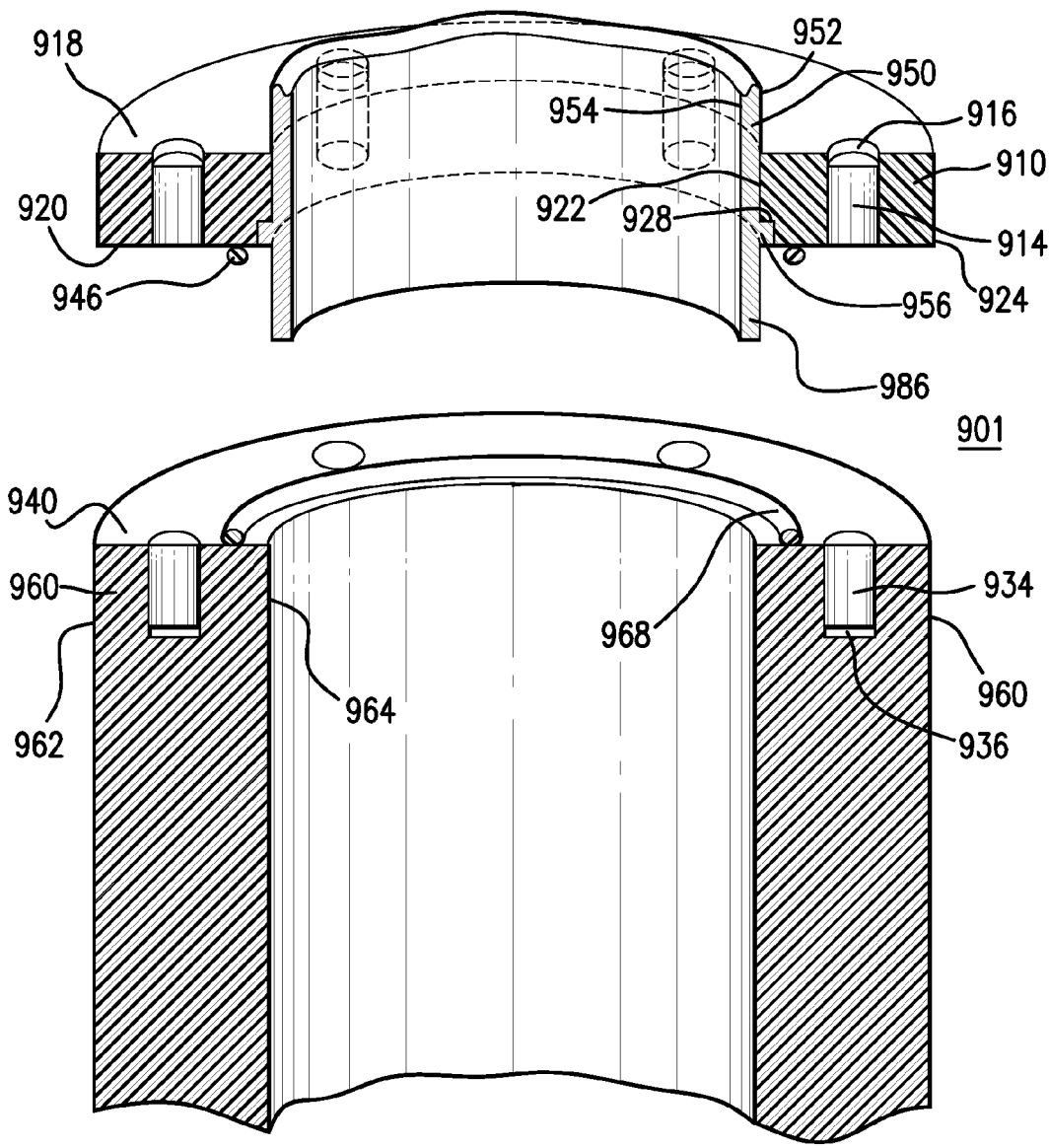
FIG. 9 shows a three-dimensional cross-section of another embodiment for coupling device of present invention having a collar with magnet(s) and/or metal piece(s) attached to a first object and a second object having magnet(s) and/or metal piece(s) integrated into second object with collar and first object disengaged and separated from second object. Collar and first object as well as second object are shown positioned for engagement by moving first and second objects together.

Although FIG. 1 through FIG. 8 show coupling device of present invention with magnet(s) and/or metal piece(s) either as a part of a first portion and a second portion of coupling device or integrated within objects themselves, it is to be understood that coupling device of present invention may further comprise any combination thereof. For example, FIG. 9 shows a coupling device 901 comprising a collar 910 having a plurality of spaced apart magnet(s) and/or metal piece(s) 914 attached to a first object 950 and a second object 960 having a plurality of magnet(s) and/or metal piece(s) 934 integrated within second object 960. FIG. 9 shows collar 910 attached to external surface 952 of first object 950 disengaged and separated from second object 960. First object 950 is shown with a ridge 956 that is designed to mate with groove 928 at corner of proximal 920 and inner 922 surfaces of collar

910. In this way, collar 910 may be attached and held to first object 950 using "slip-fit" frictional forces. In addition, such slip-fit frictional forces may be reinforced by application of an adhesive (not shown). First object 950 is also shown with flange 986 that may be optionally present to guide and stabilize coupling device 901 when engaged. One or more gaskets may also be present on opposing surfaces of collar 910 and/or object(s) 950, 960. In this example, gaskets 946, 968 are shown on proximal surfaces 920, 940 of collar 910 and second object 960 of coupling device 901, such that gaskets 946, 968 become depressed under magnetically attractive forces when coupling device 901 is engaged.

Although flange 986 is shown as a part of first object 950 and near internal surface 964 of second object 960 when engaged, a flange may alternatively be placed on either first object 950 or second object 960 or collar 910 in any acceptable orientation. Although collar 910 of coupling device 901 is shown attached to external surface 952 of first object 950, collar 910 may alternatively be attached to internal surface 954 of first object 950. Although magnet(s) and/or metal piece(s) 914, 934 are shown regularly spaced-apart, such magnet(s) and/or metal piece(s) 914, 934 may alternatively be irregularly spaced. In addition, such magnet(s) and/or metal piece(s) 914, 934 may each comprise a single annular magnet and/or metal piece.

The coupling device of present invention has several key advantages over prior devices and methods as a means for reversibly holding two or more objects together. For instance, because coupling device of present invention may be separate from objects themselves and reversibly attached to such objects, once objects have been used, coupling device of present invention may be detached from such objects so that objects may be discarded. Coupling device may then be reused with a new set of objects. Furthermore, because coupling device of present invention may be attached to external surface of objects, coupling device may be reused with a new set of objects while eliminating or reducing any risk of cross-contamination, which is an important factor for a variety of applications related to research as well as health and veterinary care.

As opposed to threaded screw-type mechanisms used for joining objects together, coupling device of present invention avoids issues relating to over-tightening and stripping by eliminating any need for threading or other physical interlocking mechanisms. Thread deterioration or stripping may cause many prior art devices and methods to become non-functional and may lead to leakage of material or contents being carried or contained by objects themselves. In this sense, coupling device of the present invention is more durable than many prior art devices and methods by not relying on any physical interlocking means, such as threading, to maintain contact. Therefore, coupling device of the present invention does not experience the normal "wear-and-tear" of many prior art devices and methods.

A further advantage of present invention is that because physical contact between two or more objects and/or coupling device may be limited to gasket(s) between two or more joined surfaces, the two or more objects joined may be electric-, signal-, radio-, and/or ground-isolated. This is especially true where such gasket(s) are made of an insulating material. In contrast, threaded screw-type mechanisms or other interlocking mechanisms relying on mechanical forces to maintain contact between objects often create continuous conductivity between such objects, such as where metal pipes, etc. are connected.

Another advantage of coupling device of present invention is that no torque is required to engage or disengage coupling device of present invention. Instead, to couple two or more objects together using devices and methods of present invention, such objects are simply juxtaposed in a proper orientation and/or alignment. Although a slight rotation may aid breaking of magnetic field holding two or more objects together, two or more objects may be separated by simply pulling two or more objects apart with sufficient force. For example, two or more objects may be separated by tilting and/or prying one object from another. This kind of simple engagement and disengagement of coupling device of present invention poses relatively little strain on the user by not requiring, for example, any twisting or torque to engage and disengage such objects. This is especially important for many elderly persons in particular who suffer from muscle weakness, arthritis, muscle and joint pain, etc.

Another related advantage of coupling device of present invention is that because coupling device may be engaged generally by juxtaposing portions of coupling device and/or objects and disengaged by pulling portions of coupling device and/or objects apart, the rate of assembly/mating and disassembly/separation is much faster than many other types of devices, including threaded screw-type mechanisms. Because coupling device may be generally engaged by simply juxtaposing portions of coupling device and/or objects and disengaged by pulling portions of coupling device and/or objects apart, no tools are required unlike many other types of connections.

Another potential advantage of coupling device of present invention is that because establishment of magnetically attractive forces generally relies on juxtaposition of magnet(s) and/or metal piece(s) with corresponding magnet(s) and/or metal piece(s), particular arrangements or relative orientations of two or more objects joined by coupling device may be encouraged or required. According to most of the examples and figures described above, magnet(s) and/or metal piece(s) are generally shown as being regularly spaced-apart at approximately equal angles. Such arrangements will generally encourage or require a limited number of possible alignments and relative orientations between such objects joined depending on the number of regularly spaced-apart magnet(s) and/or metal piece(s). Conversely, the number of possible alignments and relative orientations between such objects joined may be increased by increasing the number of magnet(s) and/or metal piece(s), and by extension, the number of possible alignments and relative orientations between such objects joined may become unlimited by using an annular magnet and/or piece of metal.

Figure 10A:
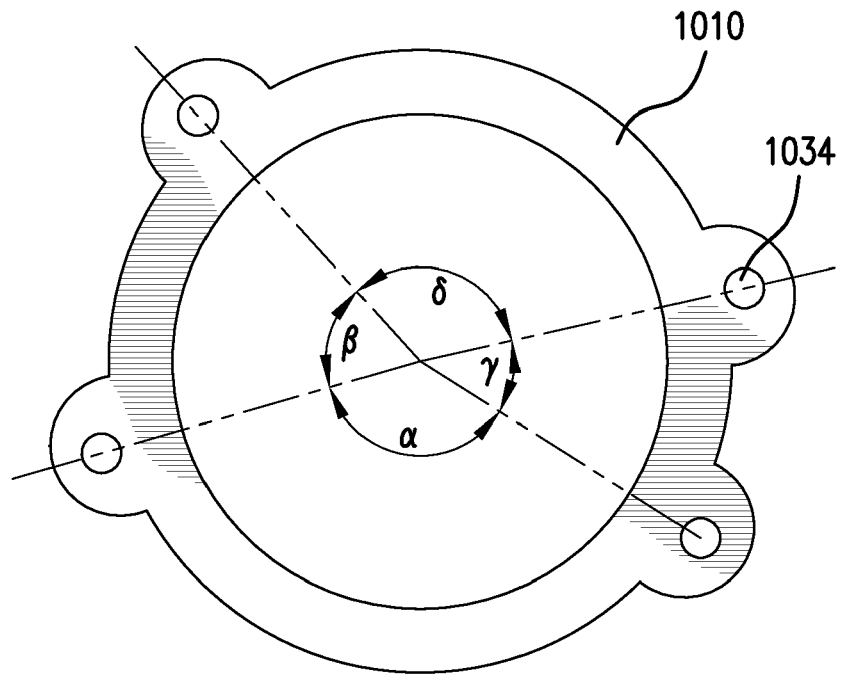
FIG. 10a shows an arrangement that would have only one stable alignment between the first and second portions of the coupling device.
Figure 10B:
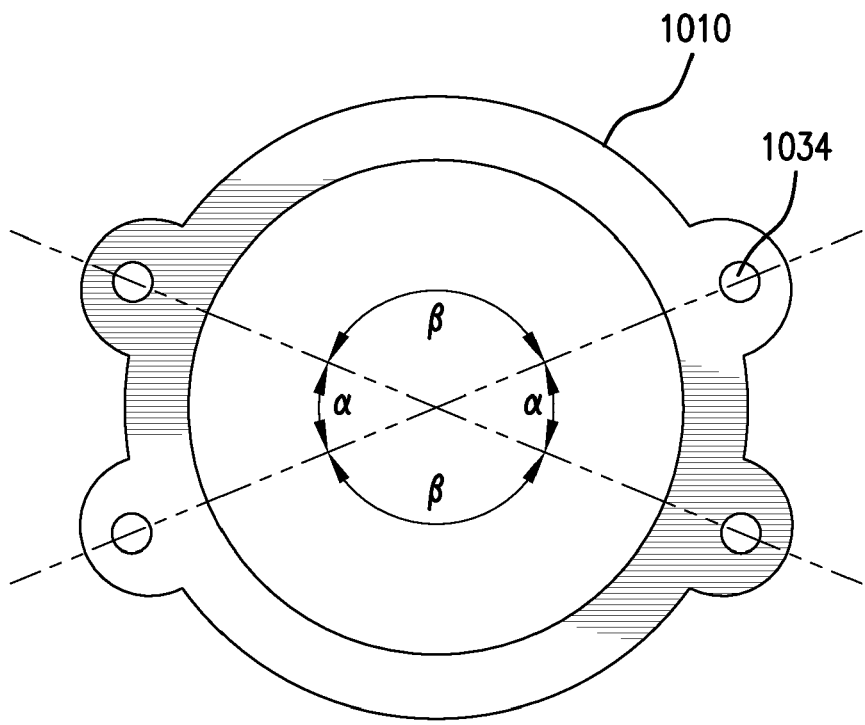
FIG. 10b shows an alternative embodiment that would have only two stable alignments of first and second portions of coupling device.

However, it is to be understood that magnet(s) and/or metal piece(s) of coupling device of present invention may be asymmetrically arranged such that the number of possible alignments and relative orientations between such objects joined is even further limited. For example, FIG. 10*a* shows four magnet(s) and/or metal piece(s) positioned at unequal angles ($\alpha$, $\beta$, $\gamma$, $\delta$), such that only one possible alignment or orientation is allowed with corresponding magnet(s) and/or metal piece(s) having the same set of unequal angles. As an additional example, FIG. 10*b* shows four magnet(s) and/or metal piece(s) positioned at unequal angles ($\alpha$, $\beta$), such that only two possible alignments or orientations are allowed with corresponding magnet(s) and/or metal piece(s) having the same unequal angles. Thus, by encouraging or requiring specific alignments of magnet(s) and/or metal piece(s), coupling device of present invention allows for objects to be quickly and automatically assembled into particular relative orientations between such objects by simply juxtaposing corresponding magnet(s) and/or metal piece(s).

Whether magnet(s) and/or metal piece(s) are asymmetric or regularly-spaced, having spaced-apart magnet(s) and/or metal piece(s) acts to limit rotational movement of coupling device relative to the objects joined by encouraging or requiring particular alignment(s) of magnet(s) and/or metal piece (s). This feature is reinforced by the fact that depending on the exact arrangement, magnetic field lines of repulsion may exist between positions of proper alignment where magnetic field lines of attraction are maximal. To help ensure that any limited rotation of coupling device is effective at similarly restraining or limiting rotation of joined objects themselves, an additional mechanical restraint, such as a ridge and groove or the like, may be added to the interface between coupling device and objects to disallow independent movement by joined objects (not shown). It is also foreseeable that particular orientations may be encouraged or required by altering the direction of the magnetic field for different corresponding magnet(s) and/or metal piece(s) (not shown).

Figure 11A:
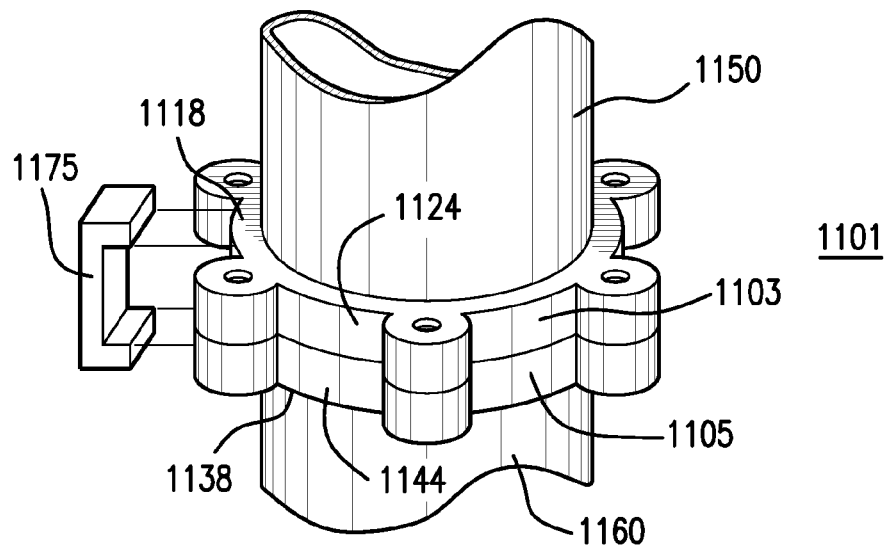
FIG. 11a shows an example of a clip that may be used to secure coupling device once engaged.

In addition to features limiting relative rotational motion between portions of coupling device and objects joined, additional fastening or securing means may be added. For example, FIG. 11a shows a clip 1175 to secure engagement of first portion 1103 and second portion 1105 of coupling device once engaged by contacting distal surfaces 1118, 1138 of first portion 1103 and second portion 1105. It is to be understood that clip 1175 shown in FIG. 11a only provides a generic example and that clip 1175 may have any shape or dimension appropriate for securing and fastening first portion 1103 and second portion 1105 of coupling device 1101 together.

Figure 11B:
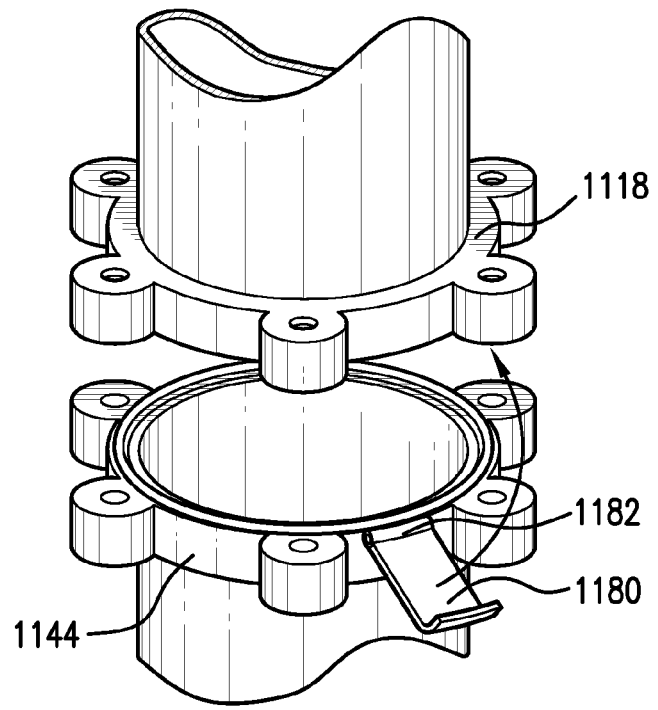
FIG. 11b shows an example of a hook that may be used to secure coupling device once engaged by swinging into place.

Another example for an additional fastening or securing means is provided in FIG. 11b. In this example, a hook 1180 is attached at its hinge 1182 to outer surface 1144 of second portion 1105 of coupling device 1101, such that hook 1180 may swing into contact with distal surface 1118 to secure engagement of first portion 1103 and second portion 1105 of coupling device 1101. It is to be understood that hook 1180 shown in FIG. 11b only provides a generic example and that hook 1180 may have any shape or dimension appropriate for securing and fastening first portion 1103 and second portion 1105 of coupling device 1101 together.

Figure 11C:
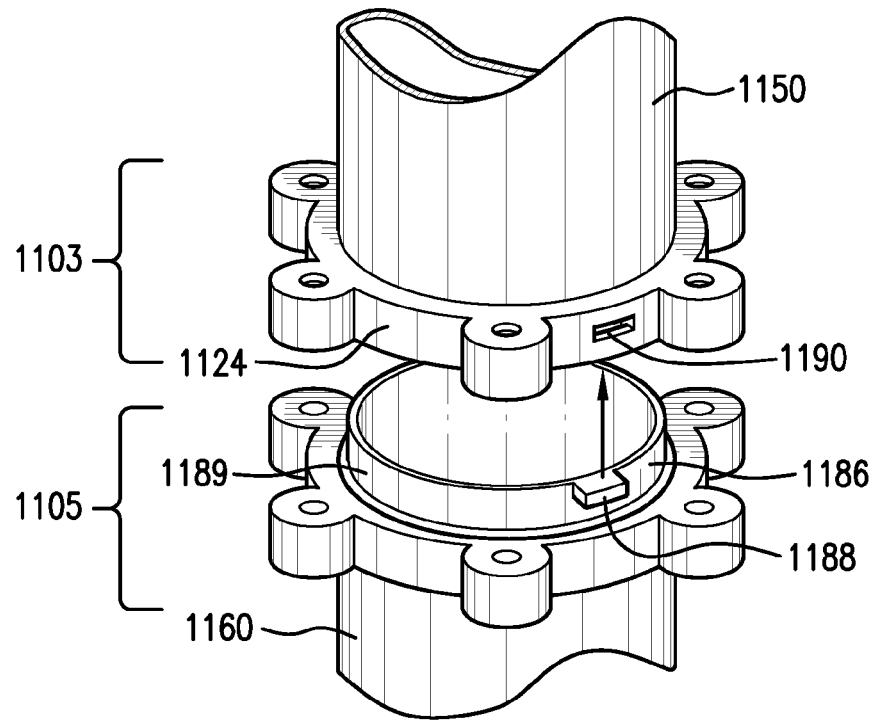
FIG. 11c shows an example of a slot and tab mechanism for securing first and second portions of coupling device together once engaged.

Another example for an additional fastening or securing means is provided in FIG. 11c. In this example, a slot 1190 is shown through first object 1150 and optionally through first portion 1103, and a tab 1188 is shown present on external surface 1189 of flange 1186 of second object 1160. Once coupling device 1101 is properly engaged, tab 1188 is able to become inserted into tab 1190 to secure and fasten first portion and second portion of coupling device together once engaged. It is to be understood that slot 1190 and tab 1188 shown in FIG. 11c only provide a generic example and that slot 1190 and tab 1188 may have any shape, orientation, or dimension appropriate for securing or fastening first portion 1103 and second portion 1105 of coupling device 1101 together.

Figure 11D:
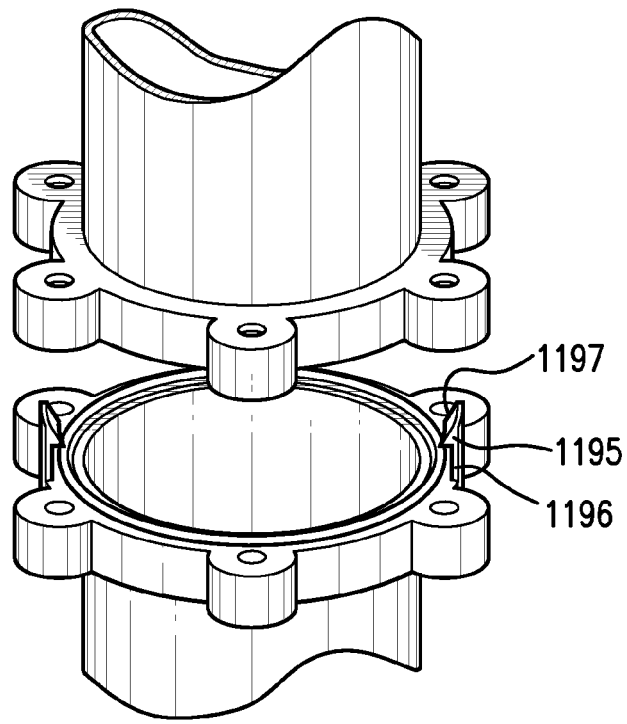
FIG. 11d shows an example of a latch that snaps into place to secure a first and second portions of coupling device together once engaged.

Another example for an additional fastening or securing means is provided in FIG. 11d. In this example, a latch 1195 is shown continuous with outer surface 1144 of second portion 1105 of coupling device 1101 and having a stem 1196 and head 1197 sections, such that stem 1196 of latch 1195 bends as first portion 1103 and second portion 1105 approach one another to achieve engagement of coupling device 1101, such that head 1197 is allowed to pass over outer surface 1124 of first portion 1103 of coupling device 1101. Once coupling device 1101 becomes fully engaged, head 1197 snaps into place to contact distal surface 1118 of first portion 1103. In this way, latch 1195 secures and fastens engagement of first portion 1103 and second portion 1105 of coupling device 1101. It is to be understood that latch 1195 shown in FIG. 11d only provides a generic example and that latch 1195 may have any shape or dimension appropriate for securing and fastening first portion 1103 and second portion 1105 of coupling device 1101 together.

Although the examples for additional fastening or securing means shown in FIG. 11a through FIG. 11d depict such fastening and securing means in relation to the particular coupling device shown, it is to be understood that other mechanical mechanisms for securing or fastening coupling device of present invention together once engaged. It should also be understood that the examples of fastening or securing means shown in FIG. 11a through FIG. 11d may also be modified to accommodate various different embodiments of the coupling device of the present invention. It should be further understood, that for each example, any the number of additional fastening or securing means may be multiplied and/or used in combination with other types of fastening or securing means.

Yet another advantage of the present invention is that the coupling device allows for the amount, orientation, and directionality of magnetically attractive forces to be adjustable depending on its intended application. As stated above, by altering the number, position, size, shape, strength, orientation, type, composition, density, etc. of magnet(s) and/or metal piece(s) in relation to one another, coupling device of present invention may be designed and customized to suit particular applications. However, it should be understood that magnet(s) and/or metal piece(s) of present invention do not have to be perfectly aligned with corresponding magnet(s) and/or metal piece(s) to be functional. Indeed, all that is required is that magnet(s) and/or metal piece(s) of present invention have appropriate characteristics, position, etc. such that sufficient magnetically attractive forces are generated by coupling device to appropriately join two or more objects for a particular application. In fact, not all magnet(s) and/or metal piece(s) must contribute to the force of attraction between two or more objects nor must they all have corresponding magnet (s) and/or metal piece(s).

Another advantage of the present invention relates to particular kinds of tubular objects, including containers and lids. By avoiding any need for threaded screw-type mechanisms or other physical interlocking mechanisms that rely on mechanical forces to maintain contact, coupling device of present invention may be designed such that contacting surfaces between portions of coupling device and/or container and lid are allowed to "breath" when the contents or materials within such closed containers or objects are under pressure. If a particular set of objects, such as a container and lid, contain a gas or fluid under pressure relative to the outside environment, such increased pressure may partially overcome the magnetically attractive forces generated by magnet(s) and/or metal piece(s) to create a gap that allows pressure to escape. As a result, pressure within the interior of such objects is reduced, and magnetically attractive forces are again allowed to overcome any forces of pressure from within such objects to rejoin and close the coupling device.

Thus, depending on the circumstances, coupling device of present invention may have an intrinsic pressure release mechanism that continually and proportionally responds to changes in pressure within such objects. As with the humidifier container example shown in FIG. 4, by designing coupling device of present invention to respond dynamically to the amount of pressure within the humidifier container, coupling device of present invention eliminates any need for a pressure release valve currently used on threaded type devices. Should a blockage of the dispensed gas flow exist, current devices have a pressure release to relieve excess pressure. However, coupling device of present invention has the advantage of relieving pressure by allowing the seal between portion(s) of coupling device and/or container and lid to be broken at least temporarily to relieve pressure. By eliminating any need for a pressure release valve by using coupling device of present invention, the cost of producing the humidifier container itself may be reduced, and the humidifier container may also be easier to clean due to there being fewer minor surfaces or crevices.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A coupling device, comprising: a first collar having at least two radially spaced-apart magnets creating a discontinuous magnetic field; and a second collar having at least two corresponding metal pieces, wherein said first collar is separate and distinct from a first object and is slidably interfaced to the first object and positioned at or near an end of said first object, wherein said second collar is separate and distinct from a second object and is slidably interfaced to the second object and positioned at or near an end of said second object, and wherein said first object and said second object are held together by the first collar and the second collar by magnetically attractive forces when said first collar and said second collar are engaged.

2. The coupling device of claim 1, wherein said at least one corresponding metal piece of said second collar comprises a plurality of radially spaced-apart metal pieces.

3. The coupling device of claim 1, wherein said at least one magnet of said first collar comprises a plurality of radially spaced-apart magnets and said at least one corresponding metal piece of said second collar comprises a plurality of radially spaced-apart metal pieces.

4. The coupling device of claim 3, wherein said plurality of radially spaced-apart magnets of said first collar and said plurality of radially spaced-apart metal pieces of said second collar are regularly spaced.

5. The coupling device of claim 4, wherein said plurality of radially spaced-apart magnets of said first collar and said plurality of radially spaced-apart metal pieces of said second collar are aligned when engaged.

6. The coupling device of claim 3, wherein said plurality of radially spaced-apart magnets of said first collar and said plurality of radially spaced-apart metal pieces of said second collar are asymmetrically spaced.

7. The coupling device of claim 6, wherein said plurality of radially spaced-apart magnets of said first collar and said plurality of radially spaced-apart metal pieces of said second collar are aligned when engaged.

8. The coupling device of claim 1, wherein said first collar is positioned around an external periphery of said first object and said second collar is positioned around an external periphery of said second object.

9. The coupling device of claim 1, wherein said first collar is positioned around an internal periphery of said first object and said second collar is positioned around an internal periphery of said second object.

10. The coupling device of claim 1, wherein said first collar is positioned around an external periphery of said first object and said second collar is positioned around an internal periphery of said second object.

11. The coupling device of claim 1, wherein said first collar is positioned around an internal periphery of said first object and said second collar is positioned around an external periphery of said second object.

12. The coupling device of claim 1, wherein said first object further comprises a ridge and said first collar further comprises a groove, such that said ridge of said first object forcibly fits into said groove of said first collar when attached.

13. The coupling device of claim 1, wherein said second object further comprises a ridge and said second collar further comprises a groove, such that said ridge of said second object forcibly fits into said groove of said second collar when attached.

14. The coupling device of claim 1, wherein said first collar further comprises a gasket that contacts said second collar when said first collar and said second collar are engaged.

15. The coupling device of claim 1, wherein said second collar further comprises a gasket that contacts said first collar when said first collar and said second collar are engaged.

16. The coupling device of claim 1, wherein said first object further comprises a gasket that contacts said second object when said first collar and said second collar are engaged.

17. The coupling device of claim 1, wherein said second object further comprises a gasket that contacts said first object when said first collar and said second collar are engaged.

18. The coupling device of claim 1, wherein said first object comprises a tubular object.

19. The coupling device of claim 18, wherein said first object comprises a container.

20. The coupling device of claim 19, wherein said second object comprises a lid.

21. The coupling device of claim 18, wherein said second object comprises a tubular object.

22. The coupling device of claim 1, wherein said first object further comprises a flange to guide the engagement of said second collar attached to said second object with said first collar attached to said first object.

23. The coupling device of claim 1, wherein said second object further comprises a flange to guide the engagement of said first collar attached to said first object with said second portion of said coupling device attached to said second object.

24. The coupling device of claim 1, wherein said coupling device further comprises means for securing said first portion and said second portion together when said first portion and said second portion are engaged.

25. The coupling device of claim 24, wherein said securing means comprises a clip.

26. The coupling device of claim 25, wherein said clip fits around the exterior of both of said first portion and said second portion.

27. The coupling device of claim 24, wherein said securing means comprises a hook.

28. The coupling device of claim 27, wherein said hook is fixed to said first portion and swings into a placement that secures said second portion to said first portion.

29. The coupling device of claim 27, wherein said hook is fixed to said second portion and swings into a placement that secures said first portion to said second portion.

30. The coupling device of claim 24, wherein said securing means comprises a latch.

31. The coupling device of claim 30, wherein said latch is fixed to said first portion and wherein said latch secures said second portion to said first portion when said first portion and said second portion are engaged.

32. The coupling device of claim 30, wherein said latch is fixed to said second portion and wherein said latch secures said first portion to said second portion when said first portion and said second portion are engaged.

33. The coupling device of claim 1, wherein said first collar further has at least one metal piece.

34. The coupling device of claim 1, wherein said second collar further has at least one magnet.

35. A coupling device, comprising: a first collar having at least two radially spaced-apart magnets creating a discontinuous magnetic field; and a second collar having at least two corresponding magnets, wherein said first collar is removably positioned around a first object and positioned at or near the periphery of said first object, wherein said second collar is removably attached to a second object and positioned at or near the periphery of said second object, and wherein said first object and said second object are held together by magnetically attractive forces when said first collar and said second collar are engaged, wherein said first collar is positioned around an external periphery of said first object and said second collar is positioned around an internal periphery of said second object.

36. The coupling device of claim 35, wherein said at least one corresponding magnet of said second collar comprises a plurality of radially spaced-apart magnets.

37. The coupling device of claim 35, wherein said at least one magnet of said first collar comprises a plurality of radially spaced-apart magnets and said at least one corresponding magnet of said second collar comprises a plurality of radially spaced-apart magnets.

38. The coupling device of claim 37, wherein said plurality of radially spaced-apart magnets of said first collar and said plurality of radially spaced-apart magnets of said second collar are regularly spaced.

39. The coupling device of claim 38, wherein said plurality of radially spaced-apart magnets of said first collar and said plurality of radially spaced-apart magnets of said second collar are aligned when engaged.

40. The coupling device of claim 37, wherein said plurality of radially spaced-apart magnets of said first collar and said plurality of radially spaced-apart magnets of said second collar are asymmetrically spaced.

41. The coupling device of claim 40, wherein said plurality of radially spaced-apart magnets of said first collar and said plurality of radially spaced-apart magnets of said second collar are aligned when engaged.

42. The coupling device of claim 35, wherein said first collar is positioned around an external periphery of said first object and said second collar is positioned around an external periphery of said second object.

43. The coupling device of claim 35, wherein said first object further comprises a ridge and said first collar of said coupling device further comprises a groove, such that said ridge of said first object forcibly fits into said groove of said first collar when attached.

44. The coupling device of claim 35, wherein said second object further comprises a ridge and said second collar of said coupling device further comprises a groove, such that said ridge of said second object forcibly fits into said groove of said second collar when attached.

45. The coupling device of claim 35, wherein said first collar further comprises a gasket that contacts said second collar when said first collar and said second collar are engaged.

46. The coupling device of claim 35, wherein said second collar further comprises a gasket that contacts said first collar when said first collar and said second collar are engaged.

47. The coupling device of claim 35, wherein said first object further comprises a gasket that contacts said second object when said first collar and said second collar are engaged.

48. The coupling device of claim 35, wherein said second object further comprises a gasket that contacts said first object when said first collar and said second collar are engaged.

49. The coupling device of claim 35, wherein said first object comprises a tubular object.

50. The coupling device of claim 49, wherein said first object comprises a container.

51. The coupling device of claim 50, wherein said second object comprises a lid.

52. The coupling device of claim 49, wherein said second object comprises a tubular object.

53. The coupling device of claim 35, wherein said first object further comprises a flange to guide the engagement of said first collar of said coupling device attached to said first object with said second collar of said coupling device attached to said second object.

54. The coupling device of claim 35, wherein said second object further comprises a flange to guide the engagement of said first collar of said coupling device attached to said first object with said second collar of said coupling device attached to said second object.

55. The coupling device of claim 35, wherein said coupling device further comprises means for securing said first collar and said second collar together when said first portion and said second portion are engaged.

56. The coupling device of claim 55, wherein said securing means comprises a clip.

57. The coupling device of claim 56, wherein said clip fits around the exterior of both of said first portion and said second portion.

58. The coupling device of claim 55, wherein said securing means comprises a hook.

59. The coupling device of claim 58, wherein said hook is fixed to said first portion and swings into a placement that secures said second portion to said first portion.

60. The coupling device of claim 58, wherein said hook is fixed to said second portion and swings into a placement that secures said first portion to said second portion.

61. The coupling device of claim 55, wherein said securing means comprises a latch.

62. The coupling device of claim 61, wherein said latch is fixed to said first collar and wherein said latch secures said second collar to said first collar when said first collar and said second collar are engaged.

63. The coupling device of claim 61, wherein said latch is fixed to said second collar and wherein said latch secures said first collar to said second collar when said first collar and said second collar are engaged.

64. The coupling device of claim 35, wherein said first collar further has at least one metal piece.

65. The coupling device of claim 35, wherein said second collar further has at least one metal piece.

66. A coupling device, comprising: a first collar having at least two radially spaced-apart magnets creating a discontinuous magnetic field; and a second collar having at least two corresponding magnets, wherein said first collar is removably positioned around a first object and positioned at or near the periphery of said first object, wherein said second collar is removably attached to a second object and positioned at or near the periphery of said second object, and wherein said first object and said second object are held together by magnetically attractive forces when said first collar and said second collar are engaged, wherein said first collar is positioned around an internal periphery of said first object and said second collar is positioned around an internal periphery of said second object.

67. A coupling device, comprising: a first collar having at least two radially spaced-apart magnets creating a discontinuous magnetic field; and a second collar having at least two corresponding metal pieces, wherein the first collar is separate and distinct from the second collar and the first collar is slidably engaged with an end of a first object and the second collar is slidably engaged with an end of a second object, such that when said first collar and said second collar are engaged, said first object and said second object are held together by magnetically attractive forces between the at least two radially spaced-apart magnets and the at least two corresponding metal pieces.

68. The coupling device of claim 67, wherein the at least one corresponding metal piece of the first collar comprises a plurality of radially spaced-apart metal pieces.

69. The coupling device of claim 67, wherein the at least one corresponding metal piece of the second collar comprises a plurality of radially spaced-apart metal pieces.

70. The coupling device of claim 69, wherein the plurality of radially spaced-apart magnets of the first collar and the plurality of radially spaced-apart metal pieces of the second collar are regularly spaced.

71. The coupling device of claim 70, wherein the plurality of radially spaced-apart magnets of the first collar and the plurality of radially spaced-apart metal pieces of the second collar are aligned when engaged.

72. The coupling device of claim 69, wherein the plurality of radially spaced-apart magnets of the first collar and the plurality of radially spaced-apart metal pieces of the second collar are asymmetrically spaced.

73. The coupling device of claim 72, wherein the plurality of radially spaced-apart magnets of the first collar and the plurality of radially spaced-apart metal pieces of the second collar are aligned when engaged.

74. The coupling device of claim 67, wherein the second collar further comprises at least one magnet.

75. The coupling device of claim 67, wherein the at least two corresponding metal pieces of the second collar are magnets.

* * * * *